United States Patent
Jung et al.

(10) Patent No.: US 9,225,427 B2
(45) Date of Patent: Dec. 29, 2015

(54) TRANSMITTER AND RECEIVER FOR TRANSCEIVING OPTICAL SIGNALS

(75) Inventors: Peter Jung, Otterberg (DE); Guido Bruck, Voerde (DE)

(73) Assignee: UNIVERSITAET DUISBURG-ESSEN, Essen (DE)

( * ) Notice: Subject to any disclaimer, the term of this patent is extended or adjusted under 35 U.S.C. 154(b) by 360 days.

(21) Appl. No.: 13/423,340

(22) Filed: Mar. 19, 2012

(65) Prior Publication Data

US 2012/0230685 A1 Sep. 13, 2012

Related U.S. Application Data

(63) Continuation of application No. PCT/EP2009/006735, filed on Sep. 17, 2009.

(51) Int. Cl.
| | |
|---|---|
| *H04J 14/00* | (2006.01) |
| *H04B 10/00* | (2013.01) |
| *H04J 14/02* | (2006.01) |
| *H04B 10/58* | (2013.01) |
| *H04B 10/112* | (2013.01) |
| *H04B 10/114* | (2013.01) |
| *H04B 10/50* | (2013.01) |
| *H04B 10/60* | (2013.01) |

(52) U.S. Cl.
CPC .............. *H04B 10/58* (2013.01); *H04B 10/112* (2013.01); *H04B 10/1141* (2013.01); *H04B 10/504* (2013.01); *H04B 10/60* (2013.01)

(58) Field of Classification Search
CPC ...... H04J 14/002; H04J 14/005; H04J 14/007
USPC ..................... 398/43, 98, 136, 183
See application file for complete search history.

(56) References Cited

U.S. PATENT DOCUMENTS

| | | | |
|---|---|---|---|
| 6,504,636 B1* | 1/2003 | Seto et al. ................. 398/91 |
| 2002/0030877 A1* | 3/2002 | Way et al. ................. 359/183 |
| 2002/0075776 A1* | 6/2002 | Kasazumi et al. ......... 369/47.5 |
| 2003/0025957 A1* | 2/2003 | Jayakumar ................. 359/110 |
| 2003/0174782 A1* | 9/2003 | Papadias et al. ........... 375/295 |
| 2005/0231783 A1* | 10/2005 | Panzeri .................... 359/237 |
| 2005/0237971 A1* | 10/2005 | Skraparlis ................. 370/329 |
| 2006/0018669 A1* | 1/2006 | Tanaka ..................... 398/202 |
| 2006/0056855 A1* | 3/2006 | Nakagawa et al. ......... 398/183 |
| 2006/0126490 A1* | 6/2006 | Hagen et al. .............. 370/208 |
| 2008/0205533 A1* | 8/2008 | Lee et al. .................. 375/260 |
| 2009/0169213 A1* | 7/2009 | Lowery et al. ............. 398/98 |

(Continued)

FOREIGN PATENT DOCUMENTS

| | | |
|---|---|---|
| CN | 101 310 458 A | 11/2008 |
| WO | WO 2004/038962 A1 | 5/2004 |

OTHER PUBLICATIONS

Newton's Telecom Dictionary 22nd edition, p. 146.*

(Continued)

*Primary Examiner* — Oommen Jacob
(74) *Attorney, Agent, or Firm* — Norman B. Thot

(57) ABSTRACT

A transmitter for transmitting an optical signal based on a baseband signal, including an up-transformer for up-transforming the baseband signal to obtain a bandpass signal and a converter for converting the bandpass signal into a signal having a DC-offset. The transmitter further includes a modulator for modulating a light source with the signal having the DC-offsets to transmit the optical signal.

20 Claims, 8 Drawing Sheets

(56) References Cited

U.S. PATENT DOCUMENTS

| | | | |
|---|---|---|---|
| 2010/0142637 A1* | 6/2010 | Hu et al. | 375/260 |
| 2010/0254711 A1* | 10/2010 | Miller | 398/136 |

OTHER PUBLICATIONS

W. O. Popoola et al.: "BPSK Subcarrier Intensity Modulated Free-Space Optical Communications in Atmospheric Turbulence", Journal of Lightwave Technology, IEEE Service Center, vol. 27, No. 8, pp. 967-973 (Apr. 15, 2009).

N. Cvijetic et al.: "WiMAX Access using Optical Wireless Technology with Heterodyne Detection in Turbulent Atmospheric Channels", Global Telecommunication Conference, 2006, Globecom '06. IEEE, PI, pp. 1-5, (Nov. 1, 2006).

II. Elgala et al.: "Indoor Broadcasting via White LEDs and OFDM", IEEE Transactions on Consumer Electronics, IEEE Service Center, vol. 55, No. 3, pp. 1127-1134 (Aug. 1, 2009).

P. Chowdhury et al.: "Hybrid Wireless-Optical Broadband Access Network (WOBAN): Prototype Development and Research Challenges", IEEE Network Magazine, vol. 23, No. 3, pp. 41-48 (May/Jun. 2009).

S. Ou et al.: "A Control Bridge to Automate the Convergence of Passive Optical Networks and IEEE 802.16 (WiMAX) Wireless Networks", Proceedings of the Fifth IEEE Broadband Communications, Networks and Systems Conference (Sep. 2008).

G. Shen et al.: "Fixed Mobile Convergence Architectures for Broadband Access: Integration of EPON and WiMAX", IEEE Communications Magazine, vol. 45, No. 8, pp. 44-50 (Aug. 2007).

N. Ghazisaidi et al.: "Fiber-Wireless (FiWi) Access Networks: a Survey", IEEE Communications Magazine, vol. 47, No. 2, pp. 160-167 (Feb. 2009).

M. Huchard et al.: "Ultra-Broadband Wireless Home Network Based on 60-GHz WPAN Cells Interconnected via RoF", Journal of Lightwave Technology, vol. 26, No. 15, pp. 2364-2372 (2008).

W. Shieh et al.: "Coherent optical orthogonal frequency division multiplexing", IET Electronics Letters, vol. 42, No. 10, pp. 587-588 (2006).

W. Shieh et al.: "Coherent optical OFDM: Theory and design", Optics Express, vol. 16, No. 2, pp. 841-859 (2008).

A. Kaszubowska-Anandarajah et al.: "Hybrid Radio over Fiber System for Generation and Distribution of UWB Signals", Proceedings of the Tenth IEEE ICTON, vol. 4, pp. 82-85 (Jun. 2008).

II. Paul et al.: "Modelling and Influences of Transmitter and Receiver Nonlinearities in Optical OFDM Transmission", Proceedings of the 13$^{th}$ International OFDM Workshop 2008 (InOWo '08), (Aug. 2008).

M. Mayrock et al.: "Impact of Implementation Impairments on the Performance of an Optical OFDM Transmission System", Proceedings of 32$^{nd}$ European Conference on Optical Communications (ECOC), (Sep. 2006).

A. Ali et al.: "Spectral Efficiency and Receiver Sensitivity in Direct Detection Optical-OFDM", OFC 2009, paper OMT 7, (Mar. 22-26, 2009).

A.M.J. Koonen et al.: "Perspectives of Radio over Fiber Technologies", Proceedings of the OFC/NFOCEC, pp. 1-3 (Feb. 2008).

K. Kazaura et al.: "A Proposal for a Broadband Wireless Access Technology based on Radio-on-FSO Links", Proceedings of the IEEE GLOBECOM 2008, pp. 1-6 (Nov./ Dec. 2008).

D. Wake et al.: "A Novel Switched Radio over Fiber Architecture for Distributed Antenna Systems", Proceedings of the 17$^{th}$ IEEE LEOS, vol. 1, pp. 55-56 (Nov. 2004).

D. Wake et al.: "Radio over fiber for mobile communications", Proceedings of the IEEE MWP 2004, pp. 157-160 (Oct. 2004).

M. Arief et al.: "The SCM/WDM System Model for Radio over Fiber Communication Link", Proceedings of the IEEE RFM 2008, pp. 344-347 (Dec. 2008).

M. Hossen et al.: "Extension of Wireless Sensor Network by Employing RoF based 4G Network", Proceedings of the Eleventh ICAT 2009, pp. 275-278 (Feb. 2009).

M. Morant et al.: "Experimental Comparison of Transmission Performance of Multichannel OFDM-UWB Signals on FTTH Networks", Journal of Lightwave Technology, vol. 27, No. 10, pp. 1408-1414 (2009).

M. T. Riaz et al.: "On Radio over Fiber for Heterogeneous Wireless Networks", Proceedings of the Ninth IFIP WOCN, pp. 1-4 (Apr. 2009).

S. Sabesan et al.: "Demonstration of Improved Passive UHF RFID Coverage using Optically-Fed Distributed Multi-Antenna System", Proceedings of the IEEE RFID 2009, pp. 217-224 (Apr. 2009).

C. H. Yeh et al.: "Performance and Limitation of Radio-over-Fiber Network Using Standard WiMAX Signal", Proceedings of the IFIP WOCN 2009, pp. 1-4 (Apr. 2009).

H. B. Kim et al.: "A Radio over Fiber Network Architecture for Road Vehicle Communication Systems", Proceedings of the 61st IEEE Vehicular Technology Conference, vol. 5, pp. 2920-2924 (Jun. 2005).

S .R . Chaudhry et al.: "Application-controlled handover for heterogeneous multiple radios over fibre networks", IET Communications, vol. 2, No. 10, pp. 1239-1250 (2008).

M. Kamoun et al.: "Multi-RAU pilots for ROF enabled distributed antenna systems", Proceedings of the First Wireless VITAE, pp. 177-181 (May 2009).

L. Chen et al.: "A Novel Scheme for Seamless Integration of ROF with Centralized Lightwave OFDM-WDM-PON System", Journal of Lightwave Technology, vol. 27, No. 14, pp. 2786-2791 (2009).

C. Santiago et al.: "Next Generation Radio over Fiber Network Management for a Distributed Antenna System", Proceedings of the first IEEE Wireless VITAE, pp. 182-186 (May 2009).

Z. Jia et al.: "A Full-Duplex Radio-Over-Fiber System Based on Optical Carrier Suppression and Reuse", IEEE Photonics Tech. Lett., vol. 18, No. 16, pp. 1726-1728 (2006).

J. Tang et al.: "A Hybrid Radio over Fiber Wireless Sensor Network Architecture", Proceedings of the WiCOM 2007, pp. 2675-2678 (Sep. 2007).

S. Kuwano et al.: "Diversity Technique Employing Digitized Radio Over Fiber Technology for Wide-Area Ubiquitous Network", Proceedings of the IEEE Globecom 2008, pp. 1-5 (Nov./ Dec. 2008).

I. Gasulla et al.: "Simultaneous baseband and radio over fiber signal transmission over a 5 km MMF link", Proceedings of the IEEE MWP/APMP 2008, pp. 209-212 (Sep./ Oct. 2008).

A. Osseiran et al.: "The Road to IMT-Advanced Communication Systems: State-of-the-Art and Innovation Areas Addressed by the WINNER+ Project", IEEE Conununications Magazine, pp. 38-47 (Jun. 2009).

L. C. Godara: "Applications of Antenna Arrays to Mobile Communications, Part II: Beam-Forming and Direction-of-Arrival Considerations", Proceedings of the IEEE, vol. 85, pp. 1195-1245 (1997).

L. C. Godara: "Applications of Antenna Arrays to Mobile Communications, Part I: Performance Improvement, Feasibility and System Considerations" Proceedings of the IEEE, vol. 85, pp. 1031-1060 (1997).

W. P. Siriwongpairat et al.: "Multiband-OFDM MIMO Coding Framework for UWB Communication Systems", IEEE Transactions on Signal Processing, vol. 54, pp. 214-224 (2006).

T. Scholand et al.: "Fast frequency hopping OFDM concept", Electronics Letters, vol. 41, No. 13, pp. 748-749 (2005).

T. Scholand et al.: "An Introduction to FFH/OFDM, A Novel System Framework for Future Mobile Communications", Thirteenth Working Session, Wireless World Research Forum (2005).

T. Scholand et al.: "A Novel OFDM Concept with Fast Frequency Hopping for the Exploitation of Frequency Diversity", Proceedings of the World Wireless Congress (2005).

T. Scholand et al.: "On the Performance of the Physical Layer in a Novel Fast Frequency Hopping-OFDM Concept", Proceedings of the World Wireless Congress (2005).

T. Scholand et al.: "Physical Layer Performance of a Novel Fast Frequency Hopping-OFDM Concept", Proceedings of the IST Mobile Summit (2005).

* cited by examiner

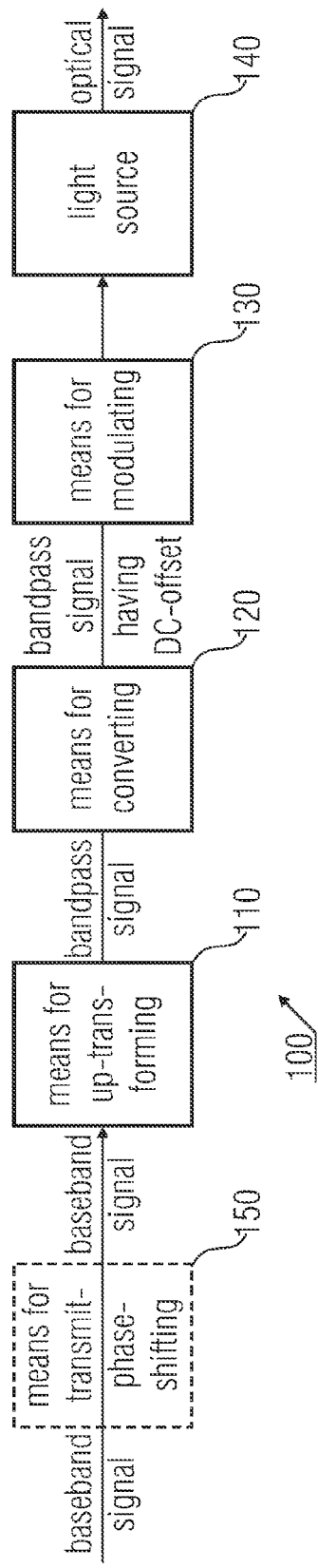

$$I(t) = f(s'(t))$$

FIG 2B $$I(t) = g \cdot s'(t) + O\left([s'(t)]^2\right)$$

FIG 2C $$I(t) = g \cdot s'(t) = \boxed{I_0} + \boxed{g \cdot s(t)}$$
$$\qquad\qquad\quad \text{unmodulated} \quad \text{modulated}$$
$$\qquad\qquad\quad\;\; \text{carrier} \qquad\;\;\; \text{carrier}$$

FIG 2D $$\underline{b}^{(n,k)}(t) = \frac{a}{\sqrt{M}} \sum_{m=1}^{M} \underline{d}_m^{(n,k)} \cdot \exp\left\{ j2\pi \frac{2m-M-1}{2T_s} t \right\}$$

where $\underline{d}_m^{(n,k)}$ = data symbol #m, block #n, link #k; frequency of subcarrier #m; $\underline{b}^{(n,k)}$ = OFDM symbol #n, link #k; M = number of subcarriers.

FIG 2E $$s^{(n,k)}(t) = 2\mathrm{Re}\left\{ \underline{b}^{(n,k)}(t) \cdot \exp\{j2\pi f_c t\} \right\} + A$$

$$= A + \frac{2a}{\sqrt{M}} \sum_{m=1}^{M} \mathrm{Re}\left\{ \underline{d}_m^{(n,k)} \exp\left\{ j2\pi \left[ \frac{2m-M-1}{2T_s} + f_c \right] t \right\} \right\}$$

FIG 2F $$\vec{k} = \frac{2\pi}{\lambda}\hat{k}, \qquad \hat{k} \| \vec{k}, \qquad \|\hat{k}\| = 1$$

TRANSMITTER AND RECEIVER FOR TRANSCEIVING OPTICAL SIGNALS

CROSS-REFERENCE TO RELATED APPLICATIONS

This application is a continuation of copending International Application No. PCT/EP2009/006735, filed Sep. 17, 2009, which is incorporated herein by reference in its entirety.

BACKGROUND OF THE INVENTION

The present invention is in the field of optical communications, especially in free-space optics.

Data services and capacity requirements have been steadily growing in the past. High data rate services become more and more accepted and appreciated. During the past decade, the backbone network experienced enormous growth in capacity and reliability, mainly due to major development efforts in the area of optical networking. During the same time, the bandwidth demands of technology-savvy end users for broadband services such as third-play (voice, video and Internet) have also increased at an unprecedented rate. The access network still remains a bottleneck for providing bandwidth-intensive services to customers. Technologies such as digital subscriber line (DSL) and cable modem (CM) cannot carry the high volume of traffic generated by emerging applications such as video-on-demand (VoD), interactive gaming, or duplex videoconferencing. Thus, future access technologies will provide high capacity and operational efficiencies along with mobility support access to users in a cost-effective manner, P. Chowdhury, B. Mukherjee, D. Sarkar, G. Kramer and S. Dixit, "Hybrid Wireless-Optical Broadband Access Network (WOBAN): Prototype Development and Research Challenges," IEEE Network Magazine, Vol. 23, No. 3, May/June 2009, pp. 41-48.

Optical fiber-based technologies are well suited to support integrated high-bandwidth digital services and can alleviate bandwidth bottlenecks, but laying fiber infrastructure to all end users incurs significant cost. Wireless access networks on the other hand, necessitate less infrastructure deployment, cf. S. Ou, K. Yang, M. P. Farrera, C. Okonkwo, K. M. Guild: A control bridge to automate the convergence of passive optical networks and IEEE 802.16 (WiMAX) wireless networks, Proceedings of the Fifth IEEE Broadband Communications, Networks and Systems Conference, September 2008. Furthermore, users also desire untethered access, especially if they are mobile. Wireless technologies can support mobility and untethered access. The integration architectures can take advantage of the bandwidth benefit of fiber communications, and the mobile and non-line-of-sight features of wireless communication, compare G. Shen, R. S. Tucker, C.-J. Chae: Fixed mobile convergence architectures for broadband access: Integration of EPON and WiMAX, IEEE Communications Magazine, Vol. 45 (2007) No. 8, pp. 44-50.

Optical and wireless technologies are expected to coexist over the next decades, cf. N. Ghazisaidi, M. Maier and C. Assi, "Fiber-wireless (FiWi) access networks: a survey," IEEE Communications Magazine, Vol. 47 (2009) No. 2, pp. 160-167. Also, it is anticipated that radio communications will be complemented by wireless optical communications. In particular, the deployment of Free-Space Optical (FSO) communication systems is considered a viable approach.

In the following, some basics on optical communications will be introduced. In general, i.e. for radio as well as for optical communications, at a transmitter, a complex baseband signal $\underline{s}(t)$ is converted into a transmission band or a bandpass signal. FIG. 4a illustrates this conversion. The baseband signal is converted from a complex domain into a propagating wave, having a carrier frequency $\omega$ and a possibly retarded wave propagation through free-space according to a wave vector $\vec{k}$. The transmitter converts the signal into a wave, propagating along the wave vector $\vec{k}$. FIG. 4b defines the wave vector mathematically. In FIG. 4b, $\lambda$ corresponds to the wave length of the respective wave. In other words, the complex baseband signal $\underline{s}(t)$ is converted from a single dimension to four dimensions, namely the frequency dimension plus three spatial dimensions.

It is to be noted that there is a significant difference between radio communications and optical communications with respect to the wavelengths. While in radio communications the wavelength ranges approximately between 10 cm to 40 cm, the wavelength for optical communication ranges between 40 to $70 \times 10^{-6}$ cm. In other words, the wavelength in radio communications is about twice the length of an antenna and, therefore, each wave half period can be detected independently of the others. This can enable coherent detection. In optical communications, the wavelength is about five orders of magnitude smaller than the size of a photo-detector, which averages over many wave periods and, therefore, the signal fades. Coherent detection is not possible and photo-detectors detect the intensity only.

FIG. 4c provides a view chart, illustrating a signal s(t) over time. The signal shown in FIG. 4c has positive and negative values, which is not possible for optical communications. For optical communications, only the positive parts of s(t) are possible, the negative parts are forbidden. Light sources are physically limited, since the intensity cannot be negative. Therefore, an optical signal is bounded as illustrated by FIG. 4d showing a similar view chart as FIG. 4c, however, this time, the signal s(t) only shows positive values. Thus, the baseband signals in free-space optics can only be On-Off Keying (OOK) modulated. On-Off Keying modulation is a rather basic modulation method where a signal is switched on and off as indicated in FIGS. 4c and 4d.

FSO systems like Infrared (IR) remote controls deploy Intensity Modulation (IM), transmitting light from an incoherent light source, typically an LED, or transmitting coherent light using e.g. a laser diode. The transmitted light is switched on and off based on a unique predetermined information sequence, yielding On-Off Keying (OOK), cf. e.g. M. Huchard, M. Weiss, Anna Pizzinat, S. Meyer, P. Guignard, B. Charbonnier: Ultra-broadband wireless home network based on 60-Ghz WPAN cells interconnected via RoF: IEEE Lightwave Journal, Vol. 26 (2008) No. 15, pp. 2364-2372 and the references therein.

Future wireless systems and mobile communication systems are foreseen to utilize optical transmission components. Some of the systems may utilize FSO. Another optical transmission technology uses guided waves as, for example, fiber optics. Some FSO systems as, for example, used in remote controls, use intensity modulation (IM), which switches on and off the emitted light of an incoherent light source as, for example, an LED or even of a coherent light source as, for example, a laser diode.

OOK is rather simple to implement, however, provides a disadvantage of a low spectral efficiency, i.e. a low transmission rate per bandwidth. Conventional concepts may utilize quadrature modulation on the transmitter side and direct mixing on the receiver side, where a receiver uses a coherent light source as a laser as well, cf. W. Shieh, C. Athaudage: Coherent optical orthogonal frequency division multiplexing, IET Electronics Letters, Vol. 42, No. 10, S. 587-588, 2006 and W.

Shieh, H. Bao, Y. Tang: Coherent optical OFDM: Theory and design, Optics Express, Vol. 16 (2008) No. 2, pp. 841-859 and A. K. Anandarajah, P. Perry, L. P. Barry: Hybrid radio over fiber system for generation and distribution of UWB signals, Proceedings of the Tenth IEEE ICTON, Vol. 4, (June 2008), pp. 82-85. Other conventional concepts use incoherent envelope detection, however, assume a real valued modulation, cf. H. Paul, K.-D. Kammeyer: Modeling and influences of transmitter and receiver nonlinearities in optical OFDM transmission, Proceedings of the 13th International OFDM Workshop 2008 (InOWo '08), Hamburg, August 2008. Conventional concepts generally favor single-side band modulation (SSB), because of its simpler implementation on the receiver side.

On the transmitter side, conventional concepts utilize laser diodes and Mach-Zehnder interferometers for optical signal creation, cf. W. Shieh, H. Bao, Y. Tang: Coherent Optical OFDM: Theory and Design, Optics Express, Bd. 16, Nr. 2, S. 841-859, January 2008; M. Mayrock, J. Haunstein: Impact of Implementation Impairments on the Performance of an Optical OFDM Transmission System, Proceedings of $32^{nd}$ European Conference on Optical Communications (ECOC), Cannes, France, September 2006 and A. Ali, J. Leibrich, W. Rosenkranz: Spectral Efficiency and Receiver Sensitivity in Direct Detection Optical-OFDM, OFC 2009, paper OMT7, San Diego, Calif., USA, 22-26.03.2009, On the receiver side, another laser diode is used with a number of photo detectors, cf., for example, FIG. 6 of W. Shieh, H. Bao, Y. Tang: Coherent Optical OFDM: Theory and Design, Optics Express, Bd. 16, Nr. 2, S. 841-859, January 2008.

OOK is spectrally inefficient, allowing only small data rates at a given bandwidth. This disadvantage can be overcome by using Higher Order Modulation (HOM), e.g. combined with multicarrier transmission schemes like Orthogonal Frequency Division Multiplexing (OFDM). To implement such optical transmission systems based on HOM and OFDM, often, quadrature modulation is used at the transmitters and direct mixing concepts are used at the receivers, e.g. based on lasers or LDs, cf. e.g. W. Shieh, C. Athaudage: Coherent optical orthogonal frequency division multiplexing, IET Electronics Letters, Vol. 42, No. 10, S. 587-588, 2006. Other receiver concepts are based on incoherent envelope detection schemes, assuming real valued modulation schemes, cf. H. Paul, K.-D. Kammeyer: Modeling and influences of transmitter and receiver nonlinearities in optical OFDM transmission, Proceedings of the 13th International OFDM Workshop 2008 (InOWo '08), Hamburg, August 2008. OFDM has also been treated in e.g. A. M. J. Koonen, M. G. Larrod e, A. Ng'oma, K. Wang, H. Yang, Y. Zheng, E. Tangdiongga: Perspectives of Radio over Fiber Technologies, Proceedings of the OFC/NFOEC, (February 2008), pp. 1-3. Subcarrier Modulation (SCM) was discussed in K. Kazaura, K. Wakamori, K. Matsumoto, T. Higashino, K. Tsukamoto, S. Komaki: A proposal for a broadband wireless access technology based on radio-on-FSO links, Proceedings of the IEEE GLOBECOM 2008, (November/December 2008), pp. 1-6.

The optical signal generation at the transmitter is usually based on LDs combined with at least one external Mach-Zehnder modulator, cf. D. Wake, K. Beacham: A novel switched radio over fiber architecture for distributed antenna system. Proceedings of the 17th IEEE LEOS, Volume 1 (November 2004), pp. 55-56, D. Wake, M. Webster, G. Wimpenny, K. Beacham, L. Crawford: Radio over fiber for mobile communications, Proceedings of the IEEE MWP 2004, (October 2004), pp. 157-160, M. Mayrock, H. Haunstein: Impact of implementation impairments on the performance of an optical OFDM transmission system, Proceedings of 32nd European Conference on Optical Communications (ECOC), Cannes, France, September 2006, A. K. Anandarajah, P. Perry, L. P. Barry: Hybrid radio over fiber system for generation and distribution of UWB signals, Proceedings of the Tenth IEEE ICTON, Vol. 4, (June 2008), pp. 82-85, M. Arief, M. Sevia, M. Idrus, S. Alifah: The SCM/WDM system model for radio over fiber communication link, Proceedings of the IEEE RFM 2008, (December 2008), pp. 344-347, W. Shieh, H. Bao, Y. Tang: Coherent optical OFDM: Theory and design, Optics Express, Vol. 16 (2008) No. 2, pp. 841-859, A. Ali, J. Leibrich, W. Rosenkranz: Spectral efficiency and receiver sensitivity in direct detection optical-OFDM, OFC 2009, paper OMT7, San Diego, Calif., USA, March 2009, M. Hossen, B.-J. Jang, K.-D. Kim, Y. Park: Extension of wireless sensor network by employing RoF based 4G network, Proceedings of the Eleventh ICACT 2009, (February 2009), pp. 275-278; M. Morant, T. F. Alves, R. Llorente, A. V. T. Cartaxo, J. Marti: Experimental comparison of transmission performance of multichannel OFDM-UWB signals on FTTH networks, IEEE Lightwave Journal, Vol. 27 (2009), No. 10, pp. 1408-1414 and M. T. Riaz, R. H. Nielsen, Pedersen, J. N. Prasad, O. B. Madsen: On radio over fiber for heterogeneous wireless networks, Proceedings of the Ninth IFIP WOCN, (April 2009), pp. 1-4.

At the receiver, LDs and often several Photo Detectors (PDs) are used, cf. e.g. FIG. 6 of W. Shieh, H. Bao, Y. Tang: Coherent optical OFDM: Theory and design, Optics Express, Vol. 16 (2008) No. 2, pp. 841-859.

Direct modulation at the transmitter side has been presented in S. Sabesan, M. Crisp, R. V. Penty, I. H. White: Demonstration of improved passive UHF RFID coverage using optically-fed distributed multi-antenna system, Proceedings of the IEEE RFID 2009, (April 2009), pp. 217-224 and H. Yeh, C. W. Chow, F. Y. Shih, C. H. Wang, Y. F. Wu, Y. LiuI, D. Z. HsuI, Allan LinI, Denial Mai, S. Chi: Performance and limitation of radio-over-fiber network using standard WiMAX signal, Proceedings of the IFIP WOCN 2009, (April 2009), pp. 1-4.

Further aspects, are resource management and quality of service, as e.g. treated in the FUTON project, cf. D. Wake et al, H. B. Kim, M. Emmelmann, B. Rathke, A. Wolisz: A radio over fiber network architecture for road vehicle communication systems, Proceedings of the 61st. IEEE Vehicular Technology Conference, Vol. 5 (June 2005), pp. 2920-2924; S. R. Chaudhry, H. S. AL-Raweshidy: Application-controlled handover for heterogeneous multiple radios over fibre networks, IET Communications, Vol. 2 (2008) No. 10, pp. 1239-1250 and M. Kamoun, S. Yang, M. D. Courville: Multi-RAU pilots for ROF enabled distributed antenna systems, Proceedings of the First Wireless VITAE (May 2009), pp. 177-181.

Another aspect are remote antennas with fibre connections connections, cf. L. Chen, J. G. Yu, S. Wen, J. Lu, Z. Dong, M. Huang, G. K. Chang: A novel scheme for seamless integration of RoF with centralized light wave OFDM-WDM-PON system, IEEE Lightwave Journal, Vol. 27 (2009) No. 14, pp. 2786-2791 and S. Sabesan, M. Crisp, R. V. Penty, I. H. White: Demonstration of improved passive UHF RFID coverage using optically-fed distributed multi-antenna system, Proceedings of the IEEE RFID 2009, (April 2009), pp. 217-224.

Background information about RoF (Radio over Fiber) with focussed beams can be found in C. Santiago, B. Gangopadhyay, A. M. Arsenio, M. V. Ramkumar, N. R. Prasad: Next generation radio over fiber network management for a distributed antenna system, Proceedings of the First IEEE Wireless VITAE, (May 2009), pp. 182-186.

Conventional methods on UWB (Ultra Wide Band) over fibre using laser-based Mach-Zehnder modulators can be found in Z. Jia, J. Yu, G.-K. Chang: A full-duplex radio-over-fiber system based on optical carrier suppression and reuse, IEEE Photonics Tech. Lett., vol. 18 (2006) No. 16, pp. 1726-1728; J. Tang, X. Jin, Y. Zhang, X. Zhang, W. Cai: A hybrid radio over fiber wireless sensor network architecture, Proceedings of the WiCOM 2007, (September 2007), pp. 2675-2678 and S. Kuwano, Y. Suzuki, Y. Yamada, Y. Fujino, T. Fujita, D. Uchida, K. Watanabe: Diversity technique employing digitized radio over fiber technology for wide-area ubiquitous network, Proceedings of the IEEE GLOBECOM 2008, (November/December 2008), pp. 1-5.

Switching aspects are illuminated, for example, in I. Gasulla, J. Capmany: Simultaneous baseband and radio over fiber signal transmission over a 5 km MMF link, Proceedings of the IEEE MWP/APMP 2008, (September/October 2008), pp. 209-212 and S. Sabesan, M. Crisp, R. V. Penty, I. H. White: Demonstration of improved passive UHF RFID coverage using optically-fed distributed multi-antenna system, Proceedings of the IEEE RFID 2009, (April 2009), pp. 217-224. The backbone architecture is considered by A. Osseiran, E. Hardouin and A. Gouraud, M. Boldi, I. Cosovic, K. Gosse, J. Luo, S. Redana, W. Mohr, J. F. Monserrat, T. Svensson, A. Tölli, A. Mihovska, M. Werner: The road to IMT-advanced communication systems: State-of-the-art and innovation areas addressed by the WINNER+ project, IEEE Communications Magazine, (June 2009), pp. 38-47.

SUMMARY

According to an embodiment, a transmitter for transmitting an optical signal based on a baseband signal may have: a means for transmit-phase-shifting the baseband signal to obtain a phase-shifted baseband signal; a means for up-transforming the phase-shifted baseband signal and another baseband signal to obtain bandpass signals; a means for converting the bandpass signals into signals having a DC-offset; and a means for modulating a plurality of light sources with the signals having the DC-offset to transmit the optical signals; wherein the means for transmit-phase-shifting is adapted for phase-shifting the baseband signal according to a precoding scheme, a spatial multiplexing scheme and/or a beamforming scheme.

Another embodiment may have a lighting including an inventive transmitter.

According to another embodiment, a method for transmitting an optical signal based on a baseband signal may have the steps of: transmit-phase-shifting the baseband signal to obtain a phase-shifted baseband signal; up-transforming the phase-shifted baseband signal and another baseband signal to obtain bandpass signals; converting the bandpass signals into signals having a DC-offset; and modulating a plurality of light sources with the signals having the DC-offset to transmit the optical signals; wherein the transmit-phase-shifting is adapted for phase-shifting the baseband signal according to a preceding scheme, a spatial multiplexing scheme and/or a beamforming scheme.

According to another embodiment, a receiver for receiving baseband signals based on a plurality of optical signals may have: a means for demodulating the optical signals into electrical bandpass signals having a DC-offset; a means for compensating the DC-offset to obtain bandpass signals; and a means for down-transforming the bandpass signals to obtain the baseband signals; and a means for receive-phase-shifting the baseband signals according to a coding scheme, a spatial multiplexing scheme and/or a beam-forming scheme.

Another embodiment may have a mobile device including an inventive receiver.

According to another embodiment, a method for receiving baseband signals based on a plurality of optical signals may have the steps of: demodulating the optical signals into electrical bandpass signals having a DC-offset; compensating the DC-offset to obtain bandpass signals; and down-transforming the bandpass signals to obtain the baseband signals; and receive-phase-shifting the baseband signals according to a coding scheme, a spatial multiplexing scheme and/or a beam forming scheme.

Another embodiment may have a system including an inventive transmitter and an inventive receiver.

Another embodiment may have a computer program having a program code for performing the inventive methods when the computer program runs on a computer or processor.

Embodiments of the present invention are based on the finding that directly modulated light sources can be deployed for optical communication when using an additional DC (direct current) component on the prior DC-free intermediate frequency (IF) or radio frequency (RF) signal. It is a finding of the present invention that the result of this DC-overlaying can be a non-zero-crossing signal and can therewith enable coherent detection of the envelope of the optical signal. Moreover, embodiments of the present invention are based on the finding that an incoherent light source may be modulated with a bandpass signal having a DC component. Therewith, coherent detection of the complex envelope can be enabled using an incoherent light source, which is available at lower costs than coherent light sources.

Embodiments of the present invention are further based on the finding that at a receiver, a bandpass filtering unit, which may remove the DC-offset from the bandpass signal can be utilized in order to detect the complex envelope. On the receiver side, it is a further finding that a rather inexpensive photo diode (PD) may be utilized in order to receive and demodulate the bandpass signal having the DC-offset.

It is a further finding that in an embodiment, a light-emitting diode (LED), which generates incoherent light or a laser diode (LD), which generates coherent radiation, may be utilized as light source in embodiments of a transmitter.

Therefore, embodiments may provide the advantage that Mach-Zehnder modulators may not be necessitated anymore on either the transmitter or receiver side. On the receiver side, in some embodiments, only a simple PD (photo detector) may be utilized. Embodiments may provide the advantage that coherent light sources are not necessitated at the receiver.

Embodiments are further based on the finding that since a complex envelope can be detected coherently, phase information can be transmitted as well. Therewith, as a further finding of the present invention, multiple signals having different phase information may be transmitted, enabling the possibility of, for example, spatial pre-coding or multiplexing techniques. It is a further finding that based on the above aspects, optical MIMO (Multiple-Input-Multiple-Output) and beamforming (BF) may be carried out using optical signals. It is another finding of the present invention that especially when transmitting radio signals over free-space optics (FSO) with MIMO, higher data rates or channel capacities can be achieved, for example, by using unfocused beams and diffused scattering including beam-forming concepts with LEDs.

Embodiments of the present invention may provide the advantage that Mach-Zehnder modulators are not necessitated any more on either transmission side. Embodiments may provide the advantage that an incoherent light source may be used on a transmitter side as, for example, an LED. On the receiver side, a simple photodiode may be used for reception of the optical signals.

BRIEF DESCRIPTION OF THE DRAWINGS

Embodiments of the present invention will be detailed subsequently referring to the appended drawings, in which:

FIG. 1a shows an embodiment of a transmitter;

FIGS. 2b to 2f provide equations with respect to an embodiment enabling coherent detection of a complex amplitude of a wave emitted by an incoherent light source;

DETAILED DESCRIPTION OF THE INVENTION

FIG. 1a illustrates an embodiment of a transmitter 100. The transmitter 100 is adapted for transmitting an optical signal based on a baseband signal.

Figure 2A:
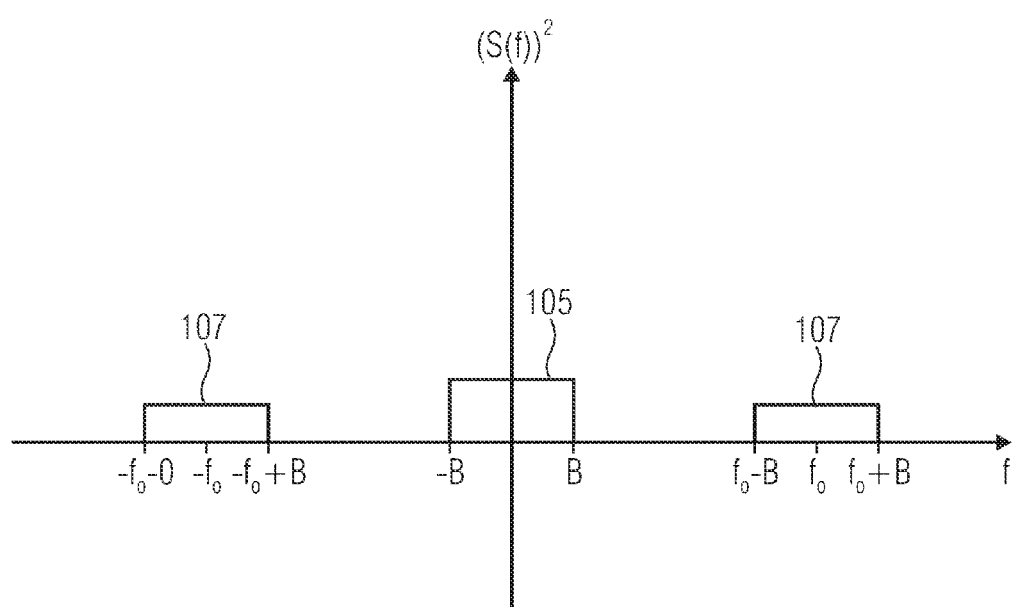
FIG. 2a illustrates the relation between a bandpass signal and a baseband signal.

A baseband signal is to be understood as an electrical signal, which is symmetric to the zero-frequency having a spectrum including the zero frequency and being limited by a certain frequency B, having a total bandwidth including negative frequencies of 2B. The spectrum of such a baseband signal is illustrated in FIG. 2a. A first spectrum 105 illustrates a spectrum of a baseband signal having a bandwidth of 2B. For example, by mixing such a baseband signal, it can be converted into a bandpass signal, which is exemplified in FIG. 2a by the two spectra 107. Here, it is shown that the bandpass spectra 107 are replica of the baseband spectrum 105 centered at the carrier frequencies $+/-f_0$. As can be seen in FIG. 2a, $f_0$ is greater than 2B.

As opposed to a baseband signal, a bandpass signal does not involve zero frequencies, but rather starts at a certain frequency, as exemplified in FIG. 2a as $f_0-B$, and reaches to another frequency $f_0+B$, the negative components, respectively. In the following, for a bandpass signal, it is assumed that no frequency components are comprised in a spectral section between the zero frequency and a lower limit of the spectrum of the bandpass signal and that there are no spectral components above an upper limit of the bandpass spectrum and infinity. For the negative components of a spectrum of a bandpass signal, similar assumptions hold, i.e. there are no spectral components between the zero frequency and a negative lower limit (lower/upper with respect to magnitude) of the spectrum of the bandpass signal, and there are no components between the upper limit of the bandpass spectrum and negative infinity.

It is to be noted that a bandpass signal may correspond to an electrical signal being centered at an intermediate frequency, a high frequency or a radio frequency, which are non-zero. In other words, referring to FIG. 2a, the frequency $f_0$ may correspond to an intermediate frequency, a high frequency or a radio frequency and is not equal to the zero frequency. The baseband signal may correspond to an electrical signal, having a certain bandwidth. In some embodiments, it may correspond to an OFDM or an UWB signal. In some embodiments, block-wise processing may be carried out. In such embodiments, the baseband signal may correspond to a number of symbols to be transmitted, which may be taken from a complex symbol alphabet.

Coming back to the embodiment of the transmitter 100 in FIG. 1a, it can be seen that the transmitter 100 comprises a means 110 for up-transforming the baseband signal to obtain a bandpass signal. Moreover, the transmitter 100 comprises a means 120 for converting the bandpass signal into a signal having a DC-offset. In the following, a signal having a DC-offset is to be understood as a signal, for which during a limited duration as, for example, determined by a number of samples, an average or mean value is non-zero. Having a DC-offset means that the average value over said set of samples does not equal zero, but has a certain value, which can be positive or negative. As common, signal processing in embodiments of the transmitter 100 may be carried out block-wise in terms of a number of samples, i.e. in terms of the so-called block-wise processing. One block or a segment of samples may even have a zero mean in the baseband, however, the means 120 for converting the bandpass signal into a signal having a DC-offset changes the zero-mean property of such a block or segment of the bandpass signal to a signal having a non-zero mean.

As can be seen from FIG. 1a, the transmitter 100 further comprises a means 130 for modulating a light source 140 with the signal having the DC-offset to transmit the optical signal.

In embodiments, the means 130 for modulating may be adapted for modulating the light source 140 so as to transmit the optical signal through free-space.

In embodiments, the means 120 for converting can be operative for adapting the DC-offset to a characteristic of the light source 140. In embodiments, the DC-offset may therefore be adapted to a power control procedure or to any characteristic as, for example, a non-linear characteristic of the light source 140. In other words, the means 120 for converting can be adapted for carrying out a pre-distortion of the bandpass signal in order to adapt to a certain characteristic of the light source 140. In embodiments, as light source 140, an incoherent light source or a coherent light source may be used. In some embodiments, as a light source 140, a light emitting diode (LED) may be used. In other embodiments, a laser diode (LD) may be utilized.

As indicated in FIG. 1a, in embodiments, the transmitter 100 may optionally comprise a means 150 for transmit-phase-shifting the baseband signal to obtain a phase-shifted baseband signal. Accordingly, the means 110 for up-transforming can be adapted for up-transforming the phase-shifted baseband signal to obtain the bandpass signal. Accordingly, the other components, i.e. the means 120 for converting, the means 130 for modulating and the light source 140 may be adapted for carrying out the above-described signal processing based on the phase-shifted baseband signal.

In embodiments, the transmitter 100 may comprise a means for transmitting the bandpass signal having the DC-offset and for creating a second copy of the baseband signal, which is phase-shifted. Accordingly, the means 110 for up-transforming may be adapted for up-transforming the baseband signal and the phase-shifted baseband signal in order to obtain the bandpass signal and a bandpass signal based on the phase-shifted baseband signal. Accordingly, parallel processing may be carried out by the means 120 for converting, such that the bandpass signal is converted to a bandpass signal having a DC-offset and the bandpass signal based on the phase-shifted baseband signal is converted to a bandpass signal being based on the phase-shifted baseband signal also having a DC-offset. Consequently, the means 130 for modulating may be adapted for modulating two light sources, one based on the bandpass signal having the DC-offset, the other modulated by the bandpass signal based on the phase-shifted baseband signal also having a DC-offset.

In other embodiments, a plurality of phase-shifted baseband signals may be provided and a plurality of light sources may be modulated, potentially all being based on differently phase-shifted baseband signals.

In embodiments, the means 150 for transmit-phase-shifting can be adapted for phase-shifting the baseband signal according to a pre-coding or a spatial multiplexing scheme. In other embodiments, the means 150 for transmit phase-shifting may be adapted for forming a beam. In such embodiments, the transmitter may comprise a plurality of light sources, for example, an array of light sources. An array of light sources may correspond to a predetermined geometrical setup of light sources as e.g. a circular array, a linear array, a two- or three dimensional array, an equidistant array, etc. The baseband signal may then be manipulated by the means 150 in a way such that space-time-coding, space-frequency-coding or beam-forming is carried out. In other embodiments, for example, when the baseband signal corresponds to an OFDM signal, such pre-coding or phase-shifting may be sub-carrier adaptive. In other words, different phase-shifts may be used for different sub-carriers. In other embodiments where an array of light sources is used, the phase-shift may be adapted to a spatial propagation channel. In other words, the phase-shifting may be adapted to certain spatial directions of the channel. In other embodiments, spatial zero-forcing block linear equalization (ZF-BLE) may be carried out by the means 150 for transmit-phase-shifting.

Figure 1B:
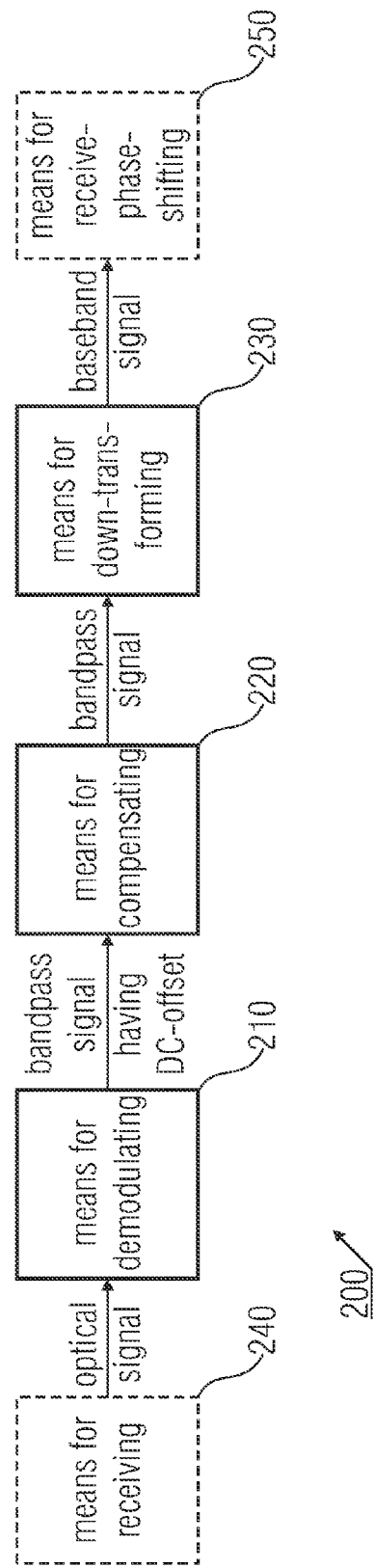
FIG. 1b shows an embodiment of a receiver.

Moreover, embodiments may comprise a receiver 200, as depicted in FIG. 1b. The embodiment of the receiver 200 is adapted for receiving a baseband signal based on an optical signal. The embodiment of the receiver 200 comprises a means 210 for demodulating the optical signal into a bandpass signal having a DC-offset. The embodiment of the receiver 200 may further comprise a means 220 for compensating the DC-offset to obtain the bandpass signal and a means 230 for down-transforming the bandpass signal to obtain the baseband signal. As indicated by the dashed box in FIG. 1b, in embodiments, the receiver 200 may further comprise means 240 for receiving the optical signal. In embodiments, the means 240 may be implemented as a photo detector, for example, as a photo diode. In embodiments, the receiver 200 may comprise a plurality of photo diodes for providing a plurality of optical signals. In embodiment, an array of photo diodes may be used to receive the plurality of optical signals. An array of photo diodes may correspond to a predetermined geometrical setup of photo diodes as e.g. a circular array, a linear array, a two- or three dimensional array, an equidistant array, etc.

As indicated in FIG. 1b, in the dashed box 250, the receiver 200 may comprise a means 250 for receive-phase-shifting according to a spatial coding- or multiplexing scheme. In other words, in embodiments, the receiver may receive a plurality of optical signals. The means 210 for demodulating, the means 220 for compensating and the means 230 for down-transforming may be adapted to process said plurality of optical signals such that a plurality of baseband signals can be provided. The plurality of baseband signals may then be processed by the means 250 for receive-phase-shifting individually before being combined. Such individual processing for the plurality of baseband signals being based on a plurality of optical signals may be carried out in terms of a coding scheme as, for example, spatial multiplexing. Such processing may, for example, include space-time- or space-frequency-coding. In embodiments, wherein the baseband signal comprises multiple sub-carriers or is wideband, the means 250 for receive-phase-shifting may be adapted to carry out sub-carrier adaptive phase-shifting, i.e. different sub-carriers in the different baseband signals may be phase-shifted differently. Moreover, beam-forming may be carried out in embodiments, i.e. the phase-shifting of the plurality of baseband signals may be adapted to an angular distribution or multiple directions of the respective optical signals.

Some embodiments may be comprised in a lighting having a transmitter according to the above description. In other words, in embodiments, there may be a lighting, for example, in a conference room, which is implemented as an array of LEDs. At the same time, the array of LEDs may be utilized to communicate, for example, with mobile devices as laptop computers or mobile phones, PDAs (personal digital assistant). In such an embodiment, the above-described optical beam-forming or spatial-multiplexing capability may be utilized to provide users in the conference room with data services. Such embodiments may provide the advantage that high data rate services may be provided to users at an enhanced security level. As compared to conventional systems as, for example, wireless local access networks (WLAN), optical communication provides the advantage that it can be shielded easily, for example, by covering windows, while radio communication is harder to secure, electromagnetic shielding would have to be installed. Optical communications provide a radiation, which is much easier to control than electromagnetic radiation. Other embodiments may implement the above-described transmitter using, in general, lighting. For example, in home environments, such lightning may be used for wireless access to, for example, the Internet, local access to local area networks, respectively.

In other embodiments, infra-red optical communications may be used, again, for its cheap and simple implementation and for security purposes, which are easy to manage. Embodiments may be implemented in a mobile computing device. Embodiments may comprise a laptop computer, a PDA or a mobile phone comprising one of the above-described receivers 200. Receive beam-forming for optical communications as described above may be utilized in such a device to enhance the data rate and in some embodiments even for establishing spatial division multiple access (SDMA).

In one embodiment, the light intensity I(t) at the output of an LED is a function of s'(t), describing a baseband signal. The equation given by FIG. 2b shows this relation. In this embodiment, a constant power gain factor g is assumed and the light intensity 40 at the output of the LED can be given by the equation depicted in FIG. 2c. Embodiments may provide a further advantage that non-linear distortions of the light source are negligible when the system is properly laid out. Therefore, according to the equation depicted in FIG. 2b, the intensity may relate to the baseband signal in a linear manner. In the equation given by FIG. 2d, $I_0$ describes the un-modulated carrier and g·s(t) describes the modulated carrier.

Figure 3A:
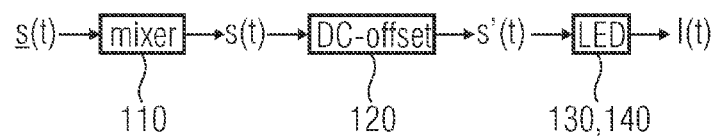
FIG. 3a illustrates an embodiment of a transmitter.

FIG. 3a shows a block diagram of a principle embodiment of a transmitter 100. In FIG. 3a, s(t) describes the baseband signal, which can be complex. In the embodiment shown in FIG. 3a, the means 110 for up-transforming the baseband signal to obtain a bandpass signal s(t) is implemented as a mixer. The mixer 110 transforms the complex envelope into a bandpass signal. In FIG. 3a, the means 120 for converting the bandpass signal into a signal having a DC-offset is implemented as a DC-offset stage 120. The bandpass signal is converted into a non-negative signal by adding a DC-offset. The signal may be non-negative or non-positive. In embodiments block-wise processing may be carried out and the DC-offset may be established in terms of processing blocks comprising samples, which then are non-zero-crossing within each block. In FIG. 3a, the means 130 for modulating the light source 140 and the light source 140 are depicted together as an LED, which is controlled by the bandpass signal having the DC-offset. The LED then transmits the optical signal. Generally, other light sources are also conceivable, the embodiment depicted in FIG. 3a utilizes a light-emitting diode. In such an embodiment the means 130 for modulating the light source 140 may correspond to a coupling of the bandpass signal having the DC-offset with the light source 140.

Embodiments therewith provide the advantage that electrical information signals with phase information can be transmitted after the conversion into a non-negative, non-positive respectively, real-valued signal. In other words, the bandpass signal can be real-valued.

In embodiments, multiple sub-carriers may be modulated according to the above description, which will be detailed subsequently. Generally, an OFDM symbol may be modulated. FIG. 2e shows an equation for the case that an OFDM symbol $\underline{b}^{(n,k)}(t)$ is to be transmitted. In the equation shown in FIG. 2e, n models the ODFM symbol and k the according user or link on which the symbol is to be transmitted. Furthermore, a models the amplitude and M models the number of sub-carriers. Moreover, $\underline{d}^{(n,k)}_m$ describes the data symbol m of block n for user or link k having a symbol duration of $T_s$. The frequency of the respective sub-carrier on which the data symbol is to be transmitted is represented by the fraction given in the exponent of the exponential function. In some embodiments, it can be assumed that the sub-carriers are mutually orthogonal. The equation for the corresponding bandpass signal $s^{(n,k)}(t)$ is given by FIG. 2f. The complex baseband OFDM symbol as given in FIG. 2e is transferred to the bandpass signal, for example, by mixing with a carrier having a carrier frequency $f_c$. Therewith, the bandpass signal may be real-valued as indicated in FIG. 2f having a DC-offset with amplitude A.

Coming back to FIG. 3a, $\underline{s}(t)$ may represent an OFDM signal, which is first digitally created and converted to an analog signal afterwards. Subsequently, a mixer 110 may transfer or convert the signal into an intermediate frequency band or into a high frequency or radio frequency band, which is represented by the bandpass signal. The bandpass signal may be real, represented by s(t). This signal, after mixing, may have a zero mean, i.e. no DC-offset may be present in said signal. Therefore, in the DC-offset stage 120 referring to FIG. 3a, a DC-offset is superimposed to the bandpass signal. The bandpass signal having the DC-offset is represented by s'(t) in FIG. 3a. s'(t) can then be used to control or modulate the output power of the light source 140, which is in FIG. 3a represented by an LED. The optical wave then has a time dependent intensity I(t).

On the receiver side, the time dependent intensity $I_e(t)$ may be received by a photo receiver, for example, a photo detector. Basically, the output signal of the photo detector can be processed in a similar way. It may be processed in an embodiment as an electrical receive signal, received at the high frequency or in the intermediate frequency band.

In the following, a detailed embodiment will be described in which a complex valued baseband signal will be assumed. As an example, not to be interpreted in any limiting way with respect to embodiments, a multi-carrier modulation, in particular OFDM, will be illuminated.

In this section, a direct modulation of the light source 140 in an embodiment shall be discussed. In particular, the embodiment of the transmitter 100 uses deployment of directly modulated light sources, the adding of a DC component on the prior DC-free IF (Intermediate Frequency) or RF (Radio Frequency) signal before using it as a modulation signal for the said light sources. Moreover, in an embodiment of the receiver 200 deployment of a bandpass filtering unit, including a DC offset compensator after a PD to remove any DC offset, is utilized.

Embodiments may make use of a light source 140 for FSO signals, e.g. an LED which generates incoherent light or an LD which generates coherent radiation. Embodiments may provide the advantage that Mach-Zehnder modulators are not used anymore and significant costs can be avoided. At the embodiment of the receiver 200, only a simple PD may be used. Embodiments may provide the advantage that coherent light sources may not be necessitated at the receiver 200.

FIG. 3a illustrates an embodiment showing a direct modulation principle. Clearly, electrical information signals with phase information can only be transmitted after conversion into for example a non-negative, real-valued signal. This can be achieved in the following way by some embodiments:
1. Transforming the complex envelope into a bandpass signal.
2. Converting the bandpass signal into a non-negative signal by adding a DC offset.
3. Modulating the light source, e.g. a light emitting diode (LED).

In the first step, the complex-valued baseband signal, $\underline{b}$, bearing the information to be transmitted, is generated. For illustration purposes, multicarrier modulation will be considered, in particular OFDM. Furthermore, the generation of any prefixes will not be considered here.

Let $$\underline{D} = \frac{1}{\sqrt{M}} \quad (1.1)$$

$$\begin{pmatrix} 1 & 1 & \cdots & 1 \\ 1 & \exp\left\{j2\pi \cdot \frac{1}{M} \cdot 1\right\} & \cdots & \exp\left\{j2\pi \cdot \frac{M-1}{M} \cdot 1\right\} \\ \vdots & \vdots & \cdots & \vdots \\ 1 & \exp\left\{j2\pi \cdot \frac{1}{M} \cdot (M-1)\right\} & \cdots & \exp\left\{j2\pi \cdot \frac{M-1}{M} \cdot (M-1)\right\} \end{pmatrix}$$

denote the M×M-matrix representing the Inverse Discrete Fourier Transform (IDFT), cf. S. L. Marple, Jr.: Digital spectral analysis with applications, Englewood Cliffs: Prentice-Hall, 1987, consisting of the elements $$[\underline{D}]_{\mu,\nu} = \frac{1}{\sqrt{M}} \cdot \exp\left\{j2\pi \cdot \frac{\nu-1}{M} \cdot (\mu-1)\right\}, \quad (1.2)$$

$$\mu, \nu \in \{1, \ldots, M\},$$

$\mu, \mu \in \{1 \ldots M\}$ denoting the sample time instant and $\nu, \nu \in \{1 \ldots M\}$ denoting the subcarrier index. Consequently, $$f_\nu = \frac{\nu-1}{M}, \quad (1.3)$$

$$\mu, \nu \in \{1, \ldots, M\},$$

is the frequency associated with the $\nu$-th subcarrier. Using the data vector $$\underline{d} = (\underline{d}_1, \underline{d}_2, \ldots, \underline{d}_M)^T \quad (1.4)$$

which contains the M complex-valued data symbols $\underline{d}_\nu$, $\nu \in \{1, \ldots, M\}$, $(\bullet)^T$ representing the transpose of $(\bullet)$, the discrete-time complex-valued baseband signal in the case of OFDM transmission can be represented by $$\underline{b} = \underline{D}\underline{d}. \quad (1.5)$$

The existence of any prefixes has been ignored in (1.5) because of their irrelevance with respect to the following presentation. The signal $\underline{b}$ is the digital version of the signal $\underline{s}(t)$ shown in FIG. 3a. After digital-to-analog conversion and filtering of the signal $\underline{b}$ given in (1.5) the generated baseband signal $\underline{s}(t)$ shown in FIG. 3a is fed into a mixer, which operates at a center frequency $f_0$, which can be a low frequency, representing an Intermediate Frequency (IF) range, or a high frequency, representing the Radio Frequency (RF) range. In this embodiment, the means 110 is implemented as a mixer 110. With the bandwidth B of $\underline{s}(t)$, it is chosen $$f_0 > B \quad (1.6)$$

The resulting real-valued output signal of the mixer is given by $$s(t) = \sqrt{2\frac{E_d}{T_d}} \operatorname{Re}\{\underline{s}(t) \cdot \exp\{j2\pi f_0 t\}\}. \quad (1.7)$$

In (1.7), $E_d$ is the average energy of a data symbol $\underline{d}_v$, $v \in \{1, \ldots, M\}$ and $T_d$ is one M-th of the duration of the OFDM symbol. Nota bene, in other embodiments, this modulation can also be carried out in the digital domain, i.e. prior to the digital-to-analog conversion.

In the following, a detailed embodiment of the means 120 for converting the bandpass signal into a signal having a DC-offset will be illuminated. In FIG. 3a, the means 120 is implemented as the DC-offset stage 120. After mixing, the signal s(t) defined by (1.7) is fed into the DC-offset unit. The signal s(t) defined by (1.7) is Direct Current (DC) free. Therefore, it assumes both negative and positive values. Let the lowest value, i.e. the minimum of s(t), be $$S_{min} = \min_{\forall t}\{s(t)\}. \quad (1.8)$$

Clearly, $S_{min} < 0$ holds. The signal s(t) takes on values between $S_{min}$ and $-S_{min}$. In order to be able to limit the effect of s(t) on the emitted light as well as in order to control the radiated power, it is recommendable to control the amplitude of s(t) by using an either constant or slowly time-varying non-negative and real-valued amplitude signal A(t), which is multiplied with s(t) in the first part of the DC offset unit, which is termed Linear Amplitude Control Part (LACP) in some embodiments. This amplitude signal A(t) may be generated based on information, which, in embodiments may exploit the characteristics of the light source 140, e.g. an LED or LD, and/or a potentially operated power control procedure.

The output signal of the LACP can be given by $$s_A(t) = A(t) \cdot s(t) \quad (1.9)$$

This signal $s_A(t)$ defined by (1.9) can then be fed into the Predistortion Part (PP) of the DC offset unit. The PP may pre-equalize potentially nonlinear characteristics of the light source in the range of $s_A(t)$ operated at a given operation point. Let f[x; t], x being a real number, be the pre-distortion characteristics, which can also be varied slowly with time, the output signal of the PP is then given by $$s_P(t) = f[s_A(t), t]. \quad (1.10)$$

The goal of this predistotion is to provide a transmitted light intensity, which is linearly dependent on $s_A(t)$ without any nonlinear distortion. Furthermore, the characteristic f[x; t] can be used to limit or clip the signal $s_A(t)$.

Let the lowest value, i.e. the minimum of $s_P(t)$, be $$S_{P,min} = \min_{\forall t}\{s_P(t)\} \quad (1.11)$$

with $S_{P,min} < 0$. Finally, the Operational Point Part (OPP) of the DC offset unit adds O(t) with $$O(t) \geq -S_{P,min} \quad (1.12)$$

to $S_p(t)$ to generate $$s'(t) = s_P(t) + O(t) \quad (1.13)$$

in order to convert $s_P(t)$ into the non-negative, real-valued signal s'(t) with $$s'(t) \geq 0. \quad (1.14)$$

In other embodiments s'(t) may be non-positive, i.e. s'(t) ≤ 0.

Generally, O(t) is either constant or only slowly time-varying.

In the following, the means 130 for modulating the light source 140 with the signal having the DC-offset to transmit the optical signal will be detailed. In some embodiments, the means 130 may correspond to an electrical connection between the means 120 and the light source 140. In other embodiments, some further processing in order to modulate the light source may be carried out by the means 130.

Finally, the non-negative, real-valued signal s'(t) introduced in (1.13) is used to modulate the light source, e.g. an LED. The generated light has the time-dependent intensity I(t) which bears the information contained in e.g. s(t) defined by (1.7).

On the receiver 200 side, the means 210 for demodulating the optical signal into a bandpass signal having a DC-offset may be implemented as a photo diode (PD). The means 220 for compensating the DC-offset to obtain the bandpass signal may be implemented as a bandpass filter. The means 230 for down-transforming the bandpass signal to obtain the baseband signal may be implemented as a mixer.

At the receiver, the received light with intensity I(t) is converted into an electrical signal in a PD. In the case of a single path channel with unit amplitude, this electrical signal can be given by $$e'(t) = s_A(t) + O(t) + n(t). \quad (1.15)$$

where n(t) represents additive noise, typically thermal noise with double-sided spectral noise power density $N_0/2$.

In the case of an optical multipath channel which is characterized by the Channel Impulse Response (CIR) h(t,τ), τ being the delay parameter, the PD produces the output signal $$e'(t) = h(\tau,t) * s_A(\tau) + O'(t) + n(t) \int_{-\infty}^{\infty} s_A(t-\tau)h(\tau,t)d\tau + O'(t) + n(t), \quad (1.16)$$

with * denoting the convolution, operating with respect to τ. The slowly time-varying signal O'(t) can be suppressed by a bandpass filter which is applied to e'(t). The output signal of this bandpass filter may then in embodiments be processed as if it was an RF or IF received signal.

In the following, the combination of MIMO with free-space optics utilizing embodiments of the above-described transmitter 100 and embodiments of the above-described receiver 200 will be detailed. First, transmit beam-forming for signals fulfilling the narrow band criterion will be considered. However, it is to be noted that embodiments are not limited to this. Subsequently, processing for signals, which do not fulfill the narrow band criterion and, hence, are considered wideband signals, will also be illuminated in further embodiments.

Figure 3B:
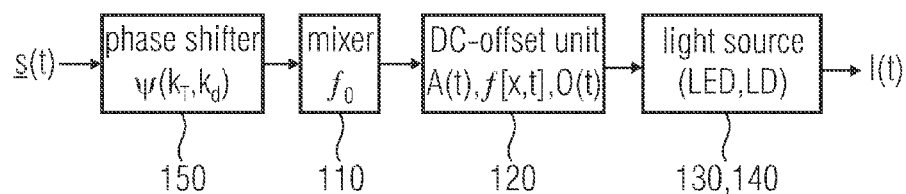
FIG. 3b illustrates another embodiment of a transmitter utilizing phase-shifting.
Figure 3C:
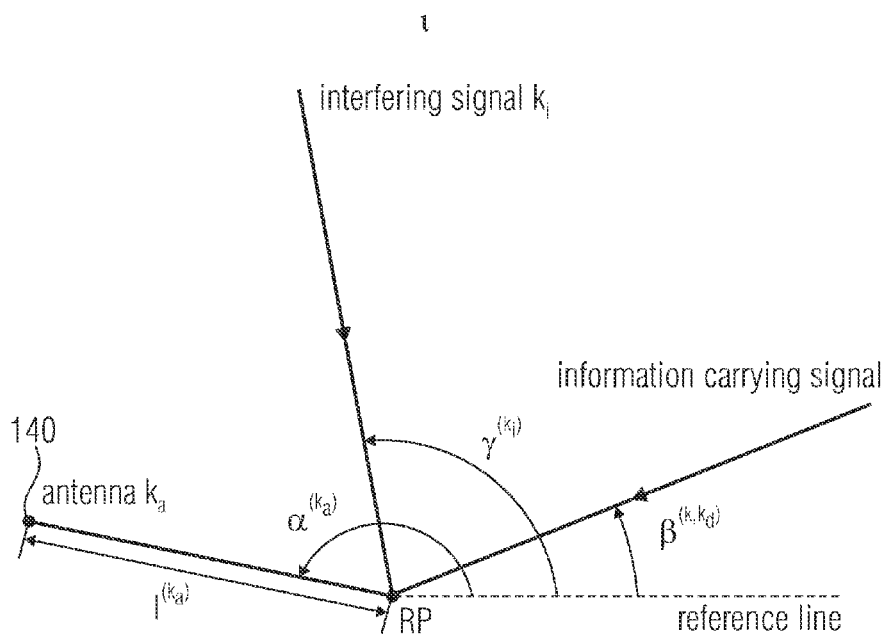
FIG. 3c illustrates the steering geometry of an embodiment utilizing an array of light sources or optical signal detectors.
Figures 4A, 4B:
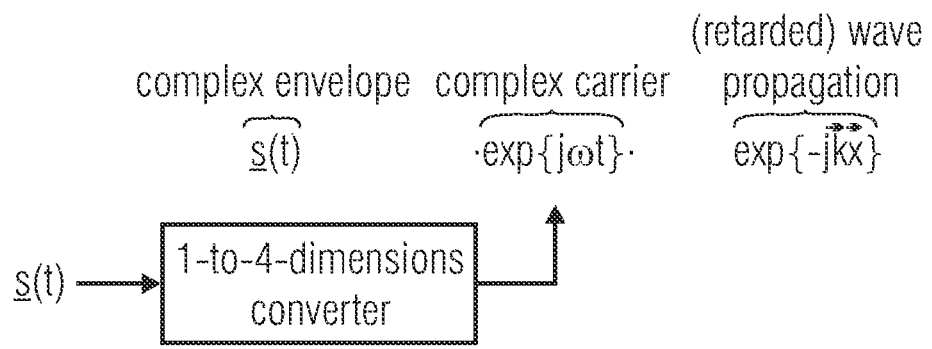
FIGS. 4a to 4d illustrate state of the art concepts.
Figure 4C:
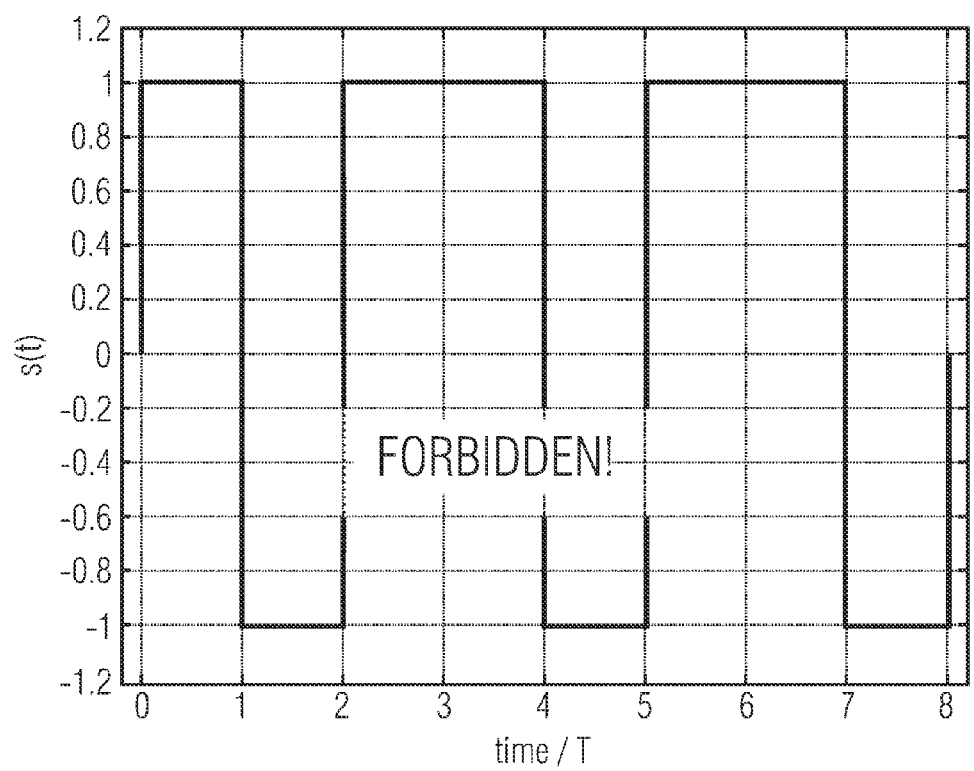
Figure 4D:
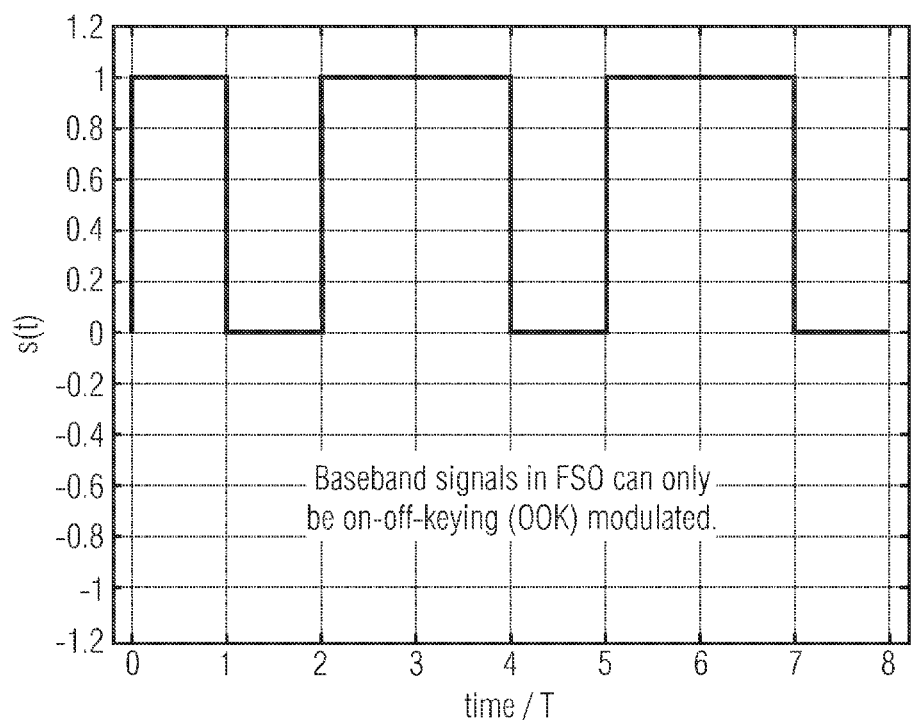

FIG. 3b shows another embodiment of a transmitter 100, further comprising a means 150 for transmit-phase-shifting the baseband signal s(t). FIG. 3c shows the geometries which are used. FIG. 3c shows an antenna element $k_a$, which may refer to a light source 140. All angles and distances are given with respect to a reference point RP, which is also shown in FIG. 3c. Moreover, FIG. 3c shows a reference line and a direction of an information-carrying signal, which has an angle of $\beta^{(k,k_d)}$ with respect to the reference line. Moreover, FIG. 3c shows an interfering signal $k_i$ having an angle $\gamma^{(k_i)}$ with respect to the reference line. The light source $k_a$ has a distance of $l^{(k_a)}$ to the reference point. The direct connection between the antenna or light source 140 and the reference point has an angle of $\alpha^{(k_a)}$ to the reference line. FIG. 3b shows a transmitter path for a light source $k_T$, $k_T \in \{1, \ldots, K_T\}$.

A wireless communication system with the following parameters will be considered for the following embodiment: Burst transmission is assumed with bursts containing two data carrying parts, each consisting of M data symbols, cf. $\underline{d}$ of (1.4). The link between a single Transmitter (TX) and a single Receiver (RX) is considered. It is further assumed that the TX uses $K_T$ transmitting light sources, e.g. LEDs, and that the RX has $K_R$ receiving PDs. At the TX, it is assumed that the distance between antenna element or light source $k_T$, $k_T \in \{1, \ldots, K_T\}$, and the reference point of the antenna or light source array is denoted by $l^{(k_T)}$, cf. e.g. J. J. Blanz, A. Papathanassiou, M. Haardt, I. Furió, P. W. Baier: Smart antennas for combined DOA and joint channel estimation in time-slotted CDMA mobile radio systems with joint detection, IEEE Transactions on Vehicular Technology, vol. 49 (2000), pp. 293-306.

Furthermore, it is assumed that each transmitted signal shall be steered at a maximum of $K_d$ directions, each denoted by $k_d$, $k_d \in \{1, \ldots, K_d\}$. This can be achieved by manipulating the phase of the baseband signal s(t) at each of the $K_T$ light sources, cf. FIG. 3b.

With the definitions of the angles $\alpha^{(k_T)}$, $k_T \in \{1, \ldots, K_T\}$, and $\beta^{(k_d)}$, $k_d \in \{1, \ldots, K_d\}$, according to J. J. Blanz et al corresponding to FIG. 3c and with $$\lambda = \frac{c_0}{f_0}, \quad (1.17)$$

wherein $c_0$ corresponds to the speed of light and $f_0$ being the IF or RF center frequency also used in (1.6) and in (1.7), the phase can be found as $$\psi(k_T, k_d) = 2\pi \cdot \frac{l^{(k_T)}}{\lambda} \cdot \cos\{\beta^{(k_d)} - \alpha^{(k_T)}\}, \quad (1.18)$$

$$k_T \in \{1, \ldots, K_T\},$$

$$k_d \in \{1, \ldots, K_d\}.$$

Using (1.18), the output signal of the phase-shifter shown in FIG. 3b can be given by $$s_\psi^{(k_T)}(t) = \sum_{k_d=1}^{K_d} s(t) \cdot \exp\{j\psi(k_T, k_d)\}, \quad (1.19)$$

$$k_T \in \{1, \ldots, K_T\}.$$

All further processing steps of the signal $s_\psi^{(k_T)}(t)$ defined by (1.19) are the same as those described above, except for the fact that these can be carried out separately for every transmitting light source $k_T$, $k_T \in \{1, \ldots, K_T\}$.

In the following, embodiments will be detailed, which use transmit beam-forming for wide band signals, i.e. for signals for which the narrow band assumption is not fulfilled.

A viable way for the spatial processing of wideband signals is to consider these as the appropriate linear superposition of a fixed number of narrowband signals. Let s(t) denote the initial wideband signal which is considered the input to the data path shown e.g. in FIG. 3b. The phase-shifter shown in FIG. 3b may contain a signal analyzer at its input which carries out the separation of the wideband signal s(t) into N narrowband signals $\underline{s}^{(n)}(t)$, $n \in \{1, \ldots, N\}$. This signal separation can e.g. be done by a filter bank allowing the signal processing in the time domain or by applying a transformation, e.g. the Fourier transformation, which enables further processing in the frequency domain.

In embodiments, signal processing may be carried out in the frequency domain or in the time domain. First, signal processing in the frequency domain will be subsequently illuminated. Conventional systems use beam-forming for UWB systems either in the time domain or in the frequency domain, cf. Godara, L. C.: Applications of antenna arrays to mobile communications, part II: Beam-forming and direction-of-arrival considerations. Proceedings of the IEEE, Bd. 85 (1997), S. 1195-1245. Time domain beam-forming is, for example, considered for impulse-radio, frequency domain processing may be considered for multi-carrier transmission. According to the state of the art point of view, cf. Godara, L. C.: Applications of antenna arrays to mobile communications, part I: Performance improvement and feasibility and system considerations, Proceedings of the IEEE, Bd. 85 (1997), S. 1031-1060 and Godara, L. C.: Applications of antenna arrays to mobile communications, part II: Beam-forming and direction-of-arrival considerations. Proceedings of the IEEE, Bd. 85 (1997), S. 1195-1245, beam-forming concepts in the frequency domain and in the time domain are not equivalent. Conventional beam-forming concepts for UWB systems consider the forming of a single beam. This corresponds to reception of a signal from a single spatial direction.

Generally, ultra high data rates and wireless communication systems are increasingly in demand. This has already been manifested in the introduction of packet-based communication services as, for example, in the universal mobile telecommunication system (UMTS), in digital video broadcasting (DVB), also for hand-held devices (DVD-H) and in digital multimedia broadcasting (DMB). Furthermore, there are global activities to implement an ultra wide band wireless system (UWB) for short-range data transmission.

It can be expected that UWB systems may use multi-carrier concepts as, for example, OFDM, as it has been proposed for the WIMEDIA concept, cf. http://www.wimedia.org/en/resources/index.asp?id=res#presentations.

Moreover, multi-carrier concepts may be considered, which inherently take advantage of frequency diversity. Some of these systems may use fast frequency hopping together with OFDM (FFH/OFDM). Research results shows that FFH/OFDM in UWB may provide significant improvements of transmission and, therewith, further increases of data rates and resource utilization or efficiency.

Smart antenna technology may be used in UWB, cf. Siriwongpairat, W. P.; Su, W.; Olfat, M.; Liu, K. J. R.: Multiband-OFDM MIMO coding framework for UWB communication systems, IEEE Transactions on Signal Processing, Bd. 54

(2006), S.214-224. Smart antennas as, for example, MIMO concepts or beam-forming concepts promise a further increase in data rates and further improvement of transmission. One concept is adaptive beam-forming, cf. Godara, L. C.: Applications of antenna arrays to mobile communications, part I: Performance improvement and feasibility and system considerations, Proceedings of the IEEE, Bd. 85 (1997), S. 1031-1060 and Godara, L. C.: Applications of antenna arrays to mobile communications, part II: Beam-forming and direction-of-arrival considerations, Proceedings of the IEEE, Bd. 85 (1997), S. 1195-1245.

Beam-forming may generally be used for wireless communication systems, for which the relation between signal bandwidth and carrier frequency is significantly lower than 1. This corresponds to the narrow band assumption. For UWB systems, which may be used in some embodiments, this assumption may be violated. Therefore, in embodiments, adaptive beam-forming for UWB systems may be carried out considering the violation of the narrow band condition. In illustration for the narrow band condition can, for example, be found in Godara, L. C.: Applications of antenna arrays to mobile communications, part II: Beam-forming and direction-of-arrival considerations, Proceedings of the IEEE, Bd. 85 (1997), S. 1195-1245. Embodiments may consider the violation of the narrow band condition and multiple users or links explicitly.

Therefore, embodiments of the present invention may use adaptive beam-forming, also for the case where impinging waves occur from multiple directions, are transmitted towards multiple directions, respectively. Moreover, embodiments of the present invention may consider a combination of adaptive beam-forming with FFH/OFDM in UWB systems, also using optical communications.

Embodiments may combine multi-carrier concepts with beam-forming concepts and may consider sub-carriers specific weighting of the signals. In other words, for the case of a single transmitter-receiver pair and only a single spatial direction used for transmission, a vector of beam-forming weights per antenna element or light source may be utilized. Moreover, embodiments may extend this concept to multiple users. And optical communications.

The assumption of a single spatial direction to which waves are propagated, from which waves are received, respectively, contradicts the multi path character of a transmission channel. Embodiments therefore may assume that waves impinge from multiple spatial directions to the receiver and that a transmitter utilizes multiple spatial directions for wave transmission. Therefore, embodiments may consider beam-forming for multiple spatial directions at the transmitter as well as on the receiver side. Embodiments may further combine this concept with FFH/OFDM and UWB.

In the following a time-discrete notation using a vector notation and a matrix notation will be used. Implicitly, a digital implementation and realization of the system is assumed. In the following embodiment a block-wise transmission of data is assumed. Per data block there are M complex data symbols $\underline{d}_1, \underline{d}_2 \ldots \underline{d}_M$. Each data symbol is taken from a symbol alphabet $\underline{V}$ having a cardinality of $\|\underline{V}\|$. Generally, the symbol alphabet may vary from data symbol to data symbol. A block of a data may be represented by a user-specific data vector.

$$\underline{d}^{(k)} = (\underline{d}_1^{(k)}, \underline{d}_2^{(k)} \ldots \underline{d}_M^{(k)})^T \tag{2.1}$$

wherein $(\cdot)^T$ notes the transposition.

A user-specific data block represents a user-specific multi carrier symbol $$\underline{b}^{(k)} = (\underline{b}_1^{(k)}, \underline{b}_2^{(k)} \ldots \underline{b}_M^{(k)})^T \tag{2.2}$$

with M complex-valued samples $\underline{b}_1^{(k)}, \underline{b}_2^{(k)} \ldots \underline{b}_M^{(k)}$. The embodiments using conventional OFDM, the OFDM symbols may be created through application of an inverse-discrete Fourier transformation (IDFT). An IDFT may be represented by a unitary M×M-matrix.

$$\underline{D} = \begin{pmatrix} [\underline{D}]_{1,1} & [\underline{D}]_{1,2} & \cdots & [\underline{D}]_{1,M} \\ [\underline{D}]_{2,1} & [\underline{D}]_{2,2} & \cdots & [\underline{D}]_{2,M} \\ \vdots & \vdots & \ddots & \vdots \\ [\underline{D}]_{M,1} & [\underline{D}]_{M,2} & \cdots & [\underline{D}]_{M,M} \end{pmatrix} \tag{2.3}$$

having elements $$[\underline{D}]_{n,m} = \frac{1}{\sqrt{M}} \left( \exp\left\{ j2\pi(n-1) \cdot \frac{(m-1)}{M} \right\} \right), \tag{2.4}$$

$$m, n = 1 \ldots M,$$

Using $\underline{d}$ from (2.1) and $\underline{D}$ of (2.3) yields $$\underline{b}^{(k)} = \underline{D}\underline{d}^{(k)}. \tag{2.5}$$

In the embodiment of using FFH/OFDM-concepts, also compare Scholand, T.; Faber, T.; Seebens, A.; Lee, J.; Cho, J.; Cho, Y.; Lee, H. W.; Jung, P.: Fast frequency hopping OFDM concept, Electronics Letters, vol. 41 (2005), S. 748-749, Scholand, T.; Faber, T.; Lee, J.; Cho, J.; Cho, Y.; Lee, H. W.; Jung, P.: An Introduction to FFH/OFDM, A Novel System Framework for Future Mobile Communications, Thirteenth Working Session, Wireless World Research Forum (WWRF), Jeju/Korea (2005), Scholand, T.; Faber, T.; Lee, J.; Cho, Y.; Jung, P.: A novel OFDM concept with fast frequency hopping for the exploitation of frequency diversity, Proceedings of the World Wireless Congress 2005 (WWC 2005), San Francisco/ USA, 2005, Scholand, T.; Faber, T.; Lee, J.; Cho, J.; Cho, Y.; Jung, P.: On the performance of the physical layer in a novel fast frequency hopping-OFDM concept, Proceedings of the World Wireless Congress 2005 (WWC 2005), San Francisco/ USA, 2005, Scholand, T.; Faber, T.; Lee, J.; Cho, J.; Cho, Y.; Jung, P.: Physical layer performance of a novel fast frequency hopping-OFDM concept, Proceedings of the IST Mobile Summit 2005, Dresden, 19.-23. Juni 2005, $\underline{D}$ may be represented by the unitary M×M-matrix $$\underline{D}_H = \begin{pmatrix} [\underline{D}_H]_{1,1} & [\underline{D}_H]_{1,2} & \cdots & [\underline{D}_H]_{1,M} \\ [\underline{D}_H]_{2,1} & [\underline{D}_H]_{2,2} & \cdots & [\underline{D}_H]_{2,M} \\ \vdots & \vdots & \ddots & \vdots \\ [\underline{D}_H]_{M,1} & [\underline{D}_H]_{M,2} & \cdots & [\underline{D}_H]_{M,M} \end{pmatrix} \tag{2.6}$$

having elements $$[\underline{D}_H]_{n,m} = \frac{1}{\sqrt{M}} \left( \exp\left\{ j2\pi(n-1) \cdot \frac{[\phi]_{n,m}}{M} \right\} \right), \tag{2.7}$$

$$m, n = 1 \ldots M.$$

This matrix may be adapted to the individual users. The real-valued elements $[\phi]_{n,m}$, m,n=1, . . . , M, of the M×M-matrix $\phi$ represent the instantaneous frequency of the respective sub-carrier, to which the data symbol $\underline{d}_m$ is assigned at time n. Therewith, $\phi$ represents the FFH-matrix, comprising the frequency hopping pattern. Moreover, $$[\phi]_{n,m} = (m-1), m,n = 1 \ldots M. \tag{2.8}$$

with $\underline{d}^{(k)}$ from (2.1) and with $\underline{D}_H$ from (2.6), the FFH/OFDM-symbol results in $$\underline{b}_H^{(k)} = \underline{D}_H \underline{d}^{(k)}. \tag{2.9}$$

The above-described FFH may be interpreted as a linear precoding for OFDM. The M×M-precoding matrix can be denoted as $$\underline{U} = \underline{D}^H \underline{D}_H, \tag{2.10}$$

wherein $(\bullet)^H$ denotes the complex conjugated transposition, the adjungation respectively. With the M×M-matrix $$\underline{A} = \underline{D} U \underline{D}^H \tag{2.11}$$

yields $$\underline{D}_H = \underline{A} \underline{D}. \tag{2.12}$$

For equation (2.9) follows $$\underline{b}_H^{(k)} = \underline{A} \underline{D} \underline{d}^{(k)}. \tag{2.13}$$

Embodiments may use cyclic frequency hopping pattern, in which $$[\phi]_{n,m} = \mathrm{mod}(f_n + m - 1, M), m,n = 1 \ldots M. \tag{2.14}$$

For these embodiments $f_n$, $n = 1 \ldots M$, representing the instantaneous frequency of the first data symbol $\underline{d}_1$ of time n. The instantaneous frequency vector can be denoted by $$\underline{f} = (f_1, f_2 \ldots f_M)^T. \tag{2.15}$$

In the following transmissions using spatially resolved ultra-wide band multi path channels will be considered. A transmitter transmitting ultra-wide band signals, will be referred to as UWB-transmitter in the following, possibly being implemented as an embodiment of the transmitter 100. Correspondingly, an embodiment of the receiver 200 may be referred to as a UWB-receiver. It is assumed that there are k, k=1...K, UWB-transmitters and one UWB-receiver. Moreover, it is supposed that each UWB-transmitter utilizes a smart antenna having $K_T$ elements. In an embodiment these elements may refer to light sources. Correspondingly, the UWB-receiver may utilize a smart antenna having $K_R$ elements, in an embodiment these elements may correspond to photo-receivers as for example photo detectors. Each smart antenna or element is located with respect to a reference point, as shown in FIG. 3c, cf. see also Blanz, J. J.: Empfangsantennendiversität in CDMA-Mobilfunksystemen mit gemeinsamer Detektion der Teilnehmersignale, Fortschrittberichte VDI, Reihe 10: Informatik/Kommunikationstechnik, Bd. 535, Dusseldorf: VDI-Verlag, 1998.

For conventional systems it is assumed that from a k-th UWB-transmitter, k=1 ... K solely a single beam is formed. Embodiments may provide the advantage that they may not be based on this assumption, as especially in UWB-systems the spatial channel may be spatially resolved and therefore assuming a single propagation path yields to a disadvantageous restriction. In the following, it is thus assumed that the k-th UWB-transmitter transmits signals towards $K_{d,R}^{(k)}$ directions.

For a mathematical modelling it is assumed that the distance between the $k_T$-th element of the smart transmit antenna from the reference point of the smart transmit antenna equals $l^{(k_T)}$, $k_T = 1 \ldots K_T$. The k-th UWB-transmitter, k=1 ... K, may transmit the transmit signal towards $K_{d,T}^{(k)}$ different directions. Each of these directions may be identified by a cardinal number $k_{d,T}$, $k_{d,R}$, $k_{d,T} = 1 \ldots K_{d,T}^{(k)}$.

Furthermore, it is assumed that beam-forming is carried out per a subcarrier. The wavelength of the n-th subcarrier is denoted by $\lambda_n$. According to FIG. 3c, the angle $\alpha^{(k_T)}$, $k_T = 1 \ldots K_T$ and $\beta^{(k,k_{d,T})}$, k=1 ... K, $k_{d,T} = 1 \ldots K_{d,T}^{(k)}$, a phase factor depending on the wavelength follows as $$\psi_T(k, k_T, k_{d,T}, \lambda_n) = 2\pi \frac{l^{(k_T)}}{\lambda_n} \cdot \cos(\beta^{(k,k_{d,T})} - \alpha^{(k_T)}), \tag{2.16}$$

$$k = 1 \ldots K, k_T = 1 \ldots K_T, k_{d,T} = 1 \ldots K_{d,T}^{(k)}, n = 1 \ldots M.$$

The angles $\alpha^{(k_T)}$, $k_T = 1 \ldots K_T$, are known at the UWB-transmitter a-priori. The angles $\beta^{(k,k_{d,T})}$, k=1 ... K, $k_{d,T} = 1 \ldots K_{d,T}^{(k)}$, are the directions along which the signals are transmitted, the so-called Directions of Departure (DOD). These directions are not known at the UWB-transmitter a-priori, and are therefore to be estimated before forming the beams in some embodiments.

At the n-th subcarrier and the $k_T$-th element of the smart receiving antenna the $1 \times K_{d,T}^{(k)}$-weighting vector follows as $$\underline{\omega}_T^{(k,k_T,\lambda_n)} = (\exp\{j\psi_T(k,k_T,1,\lambda_n)\}, \exp\{j\psi_T(k,k_T, 2\lambda_n)\} \ldots \exp\{j\psi_T(k,k_T,K_{d,T}^{(k)},\lambda_n)\}).$$

$$k=1 \ldots K, k_T = 1 \ldots K_T, n = 1 \ldots M, \tag{2.17}$$

Equation (2.17) provides the vector of the summarized phase factors. Using the Kronecker-product $\hat{x}$ and the W×W-unity matrix $1_w$ the $W \times (W \cdot K_{d,T}^{(k)})$-steering matrix can be expressed by $$\underline{A}_T^{(k,k_T,\lambda_n)} = \underline{\omega}_T^{(k,k_T,\lambda_n)} \otimes I_W \tag{2.18}$$

$$= \begin{pmatrix} \exp\{j\psi_T(k, k_T, 1, \lambda_n)\}I_W, \\ \exp\{j\psi_T(k, k_T, 2, \lambda_n)\}I_W \ldots \\ \exp\{j\psi_T(k, k_T, K_{d,T}^{(k)}, \lambda_n)\}I_W \end{pmatrix}.$$

$$k = 1 \ldots K, k_T = 1 \ldots K_T, n = 1 \ldots M,$$

Considering all subcarriers and starting out from equation (2.18), the phase-vector-matrix can be expressed as $$\underline{\Omega}_T^{(k,k_T)} = ([\underline{w}_T^{(k,k_T,\lambda_1)}]^T [\underline{w}_T^{(k,k_T,\lambda_2)}]^T \ldots [\underline{w}_T^{(k,k_T,\lambda_M)}]^T)^T, k=1 \ldots K, k_T = 1 \ldots K_T, \tag{2.19}$$

for the k-th UWB-transmitter and the $k_R$-th element of the smart receiver antenna. Using the normalized 1×M-unity vector $$u = \frac{1}{\sqrt{M}} \underbrace{(1 \; 1 \; \ldots \; 1)}_{M \text{ Ones}} \tag{2.20}$$

the $W \times (W \cdot K_{d,R}^{(k)})$-steering matrix can be determined by $$\underline{A}_T^{(k,k_T)} = (u \underline{\Omega}_T^{(k,k_T)}) \hat{x} l_w, k = 1 \ldots K, k_T = 1 \ldots K_T, \tag{2.21}$$

which can be measured.

In the following the receiver will be considered. For the receiver the distance between the $k_R$-th element of the smart receiver antenna and the reference point of the smart receiver antenna is denoted by $l^{(k_R)}$, $k_R = 1 \ldots K_R$. The distances $l^{(k_T)}$ and $l^{(k_R)}$ can be different in embodiments.

It is assumed that the k-th UWB-transmitter, k, k=1 ... K, transmits a transmit signal which arrives from $K_{d,R}^{(k)}$ different directions at the smart receiver antenna of the UWB-receiver. Each of the $K_{d,R}^{(k)}$ directions can be denoted by a cardinal number $k_{d,R}$, $k_{d,R}=1 \ldots K_{d,R}^{(k)}$. According to FIG. 3c, the angles are denoted by $\alpha^{(k_R)}$, $k_R=1 \ldots K_R$, and $\beta^{(k,k_{d,R})}$, $k=1 \ldots K$, $k_{d,R}=1 \ldots K_{d,R}^{(k)}$. The phase factor depending on the subcarrier can be expressed as $$\psi_R(k, k_R, k_{d,R}, \lambda_n) = 2\pi \frac{l^{(k_R)}}{\lambda_n} \cdot \cos(\beta^{(k,k_{d,R})} - \alpha^{(k_R)}), \quad (2.22)$$

$$k = 1 \ldots K, k_R = 1 \ldots K_R, k_{d,R} = 1 \ldots K_{d,R}^{(k)}, n = 1 \ldots M.$$

The angles $\alpha^{(k_R)}$, $k_R=1 \ldots K_R$, are known at the UWB-receiver a-priori. The angles $\beta^{(k,k_{d,R})}$, $k=1 \ldots K$, $k_{d,R}=1 \ldots K_{d,R}^{(k)}$, are the directions from which the signals are received, the so-called Directions of Arrival (DOA). These directions are not known at the UWB-receiver a-priori and have to be estimated before beam-forming can be carried out.

For the n-th subcarrier at the $k_R$-th element of the smart receiving antenna follows the $1 \times K_{d,R}^{(k)}$-weighting vector $$\underline{w}_R^{(k,k_R,\lambda_n)} = (\exp\{j\psi_R(k,k_R,1,\lambda_n)\}, \exp\{j\psi_R(k,k_R,2,\lambda_n)\} \ldots \exp\{j\psi_R(k,k_R,K_{d,R}^{(k)},\lambda_n)\}),$$

$$k=1 \ldots K, k_R=1 \ldots K_R, n=1 \ldots M, \quad (2.23)$$

which summarizes the phase factors according to equation (2.22). Again, using the Kronecker product $\hat{x}$ and the $W \times W$ unity matrix $1_w$, the $W \times (W \cdot K_{d,R}^{(k)})$-steering matrix, which depends on the subcarrier, can be expressed as $$\underline{A}_R^{(k,k_R,\lambda_n)} = \underline{\omega}_R^{(k,k_R,\lambda_n)} \otimes I_W \quad (2.24)$$

$$= \begin{pmatrix} \exp\{j\psi_R(k, k_R, 1, \lambda_n)\} I_W, \\ \exp\{j\psi_R(k, k_R, 2, \lambda_n)\} I_W \ldots \\ \exp\{j\psi_R(k, k_R, K_{d,R}^{(k)}, \lambda_n)\} I_W \end{pmatrix},$$

$$k = 1 \ldots K, k_R = 1 \ldots K_R, n = 1 \ldots M.$$

Considering all subcarriers starting out from equation (2.23) the phase factor matrix can be denoted as $$\underline{\Omega}_R^{(k,k_R)} = ([\underline{w}_R^{(k,k_R,\lambda_1)}]^T [\underline{w}_R^{(k,k_R,\lambda_2)}]^T \ldots [\underline{w}_R^{(k,k_R,\lambda_M)}]^T)^T, k=1 \ldots K, k_R=1 \ldots K_R, \quad (2.25)$$

for the k-the UWB-transmitter and the $k_R$-th element of the smart receiving antenna. With the normalized $1 \times M$-unity vector $$u = \frac{1}{\sqrt{M}} \underbrace{(1 \; 1 \; \ldots \; 1)}_{M \text{ Ones}} \quad (2.26)$$

the $W \times (W \cdot K_{d,R}^{(k)})$-steering matrix yields $$\underline{A}_R^{(k,k_R)} = (u \underline{\Omega}_R^{(k,k_R)} \hat{x} I_w, k=1 \ldots K, k_R=1 \ldots K_R, \quad (2.27)$$

which can be measured.

For each DOA $\beta^{(k,k_{d,R})}$ there is one particular channel impulse response, which can be measured at the reference point of the smart receive antenna. This channel impulse response can be denoted by a channel impulse response vector, which depends on the direction, according to $$\underline{h}_{d,R}^{(k,k_{d,R})} = (\underline{h}_{d,R,1}^{(k,k_{d,R})}, \underline{h}_{d,R,2}^{(k,k_{d,R})} \ldots \underline{h}_{d,R,W}^{(k,k_{d,R})})^T, k=1 \ldots K, k_{d,R}=1 \ldots K_{d,R}^{(k)}. \quad (2.28)$$

The channel can be considered as a W-path-channel. Using equation (2.28), the combined directional channel-impulse-response-vector can be denoted as $$\underline{h}_{d,R}^{(k)} = (\underline{h}_{d,R}^{(k,1)T} \underline{h}_{d,R}^{(k,2)T} \ldots \underline{h}_{d,R}^{(k,k_{d,R}^{(k)})T})^T,$$

$$k=1 \ldots K. \quad (2.29)$$

At the $k_R$-th element of the smart receive antenna, the channel-impulse-response-vector can be measured as $$\underline{h}^{(k,k_R)} = (\underline{h}_1^{(k,k_R)}, \underline{h}_2^{(k,k_R)} \ldots \underline{h}_W^{(k,k_R)})^T \quad (2.30)$$

$$= \underline{A}_R^{(k,k_R)} \underline{h}_{d,R}^{(k)}$$

$$= [(u\underline{Q}_R^{(k,k_R)}) \otimes I_W] \underline{h}_{d,R}^{(k)},$$

$$k = 1 \ldots K, k_R = 1 \ldots K_R.$$

Assuming that the properties of the transmission channel do not change during the duration of one data vector $\underline{d}$ according to equation (2.1), and using equation (2.30), the $(M+W-1) \times M$-channel matrix can be denoted by $$\underline{H}^{(k,k_R)} = \begin{pmatrix} \underline{h}_1^{(k,k_R)} & 0 & \ldots & 0 \\ \underline{h}_2^{(k,k_R)} & \underline{h}_1^{(k,k_R)} & \ldots & 0 \\ \vdots & \vdots & & \vdots \\ \underline{h}_W^{(k,k_R)} & \underline{h}_{W-1}^{(k,k_R)} & \ldots & 0 \\ 0 & \underline{h}_W^{(k,k_R)} & \ldots & 0 \\ 0 & 0 & \ldots & 0 \\ \vdots & \vdots & & \vdots \\ 0 & 0 & \ldots & \underline{h}_1^{(k,k_R)} \\ 0 & 0 & \ldots & \underline{h}_2^{(k,k_R)} \\ \vdots & \vdots & & \vdots \\ 0 & 0 & \ldots & \underline{h}_W^{(k,k_R)} \end{pmatrix}, \quad (2.31)$$

$$k = 1 \ldots K, k_R = 1 \ldots K_R.$$

Starting out from equation (2.31) the user-specific $K_R(M+W-1) \times M$-system matrix follows as $$\underline{H}^{(k)} = (\underline{H}^{(k,1)T}, \underline{H}^{(k,2)T} \ldots \underline{H}^{(k,K_R)T})^T, k=1 \ldots K. \quad (2.32)$$

In the following, a mathematical modelling of the multi-carrier-receive signal will be provided. The additive noise at the $k_R$-th receiver input is assumed as $$\underline{n}^{(k_R)} = (\underline{n}_1^{(k_R)}, \underline{n}_2^{(k_R)} \ldots \underline{n}_{M+W-1}^{(k_R)})^T, k_R 1 \ldots K_R. \quad (2.33)$$

The total noise-vector can be denoted by $$\underline{n} = (\underline{n}^{(1)T}, \underline{n}^{(2)T} \ldots \underline{n}^{(k_R)T})^T. \quad (2.34)$$

Using the total-noise-vector $\underline{n}$ from equation (2.34), with the multicarrier-transmit signal $\underline{b}^{(k)}$ from equation (2.5), respectively of equation (2.9), and the user specific total-system-matrix $\underline{H}^{(k)}$ of equation (2.32), the multicarrier-receive signal follows as $$\underline{e}^{(k)} = \underline{H}^{(k)} \underline{b}^{(k)} + \underline{n}, k=1 \ldots K,$$

$$\underline{e}_H^{(k)} = \underline{H}^{(k)} \underline{b}_H^{(k)} + \underline{n}, k=1 \ldots K. \quad (2.35)$$

Starting out from equation (2.35) the beamforming can be developed. In embodiments, one pragmatic approach of reception is utilization of a minimum mean square error estimator. The least squares (LS) estimator may provide a complete suppression of interference and is also known as Zero-Forcing Block Linear Equalizer (ZF-BLE). In one embodiment an estimation matrix conceivable would be of the following form:

$$\underline{M} = (\underline{H}^{(k)H} \underline{H}^{(k)})^{-1} \underline{H}^{(k)H}, k=1 \ldots K. \quad (2.36)$$

wherein $\underline{H}^{(k)H}$ is the Hermitian transpose of $\underline{H}^{(k)}$.

Summarizing these embodiments it is to be noted that the violation of the narrow band condition is explicitly assumed. Moreover, embodiments provide the advantage that multiple users are considered explicitly. Moreover, embodiments may take into account that waves may propagate through multiple paths, i.e. they can be received and transmitted along different directions. Moreover, embodiments may consider the combination of FFH/OFDM in UWB-systems together with beam-forming concepts, yielding enhanced system capacity, coverage, etc.

In the following, signal processing in the time domain will be considered. Furthermore, a system model for receive beam-forming for an embodiment will be provided subsequently. With the definitions of the angles angles $\alpha^{(k_T)}$, $k_T \in \{1, \ldots, K_T\}$, and $\beta^{(k_d)}$, $k_d \in \{1, \ldots, K_d\}$ according to J. J. Blanz et al, and with the bandwidth $$\lambda^{(n)} = \frac{c_0}{f_0^{(n)}}, \quad (1.20)$$
$$n \in \{1, \ldots, N\},$$

$c_0$ being the speed of light and $f_0^{(n)}$, $n \in \{1, \ldots N\}$, being the IF or RF center frequency associated with the narrowband signal $\underline{s}^{(n)}(t), n \in \{1, \ldots, N\}$, the phase can be found $$\psi(k_T, k_d, n) = 2\pi \cdot \frac{l^{(k_T)}}{\lambda^{(n)}} \cdot \cos\{\beta^{(k_d)} - \alpha^{(k_T)}\}, \quad (1.21)$$

$$k_T \in \{1, \ldots, K_T\}, k_d \in \{1, \ldots, K_d\}, n \in \{1, \ldots, N\}. \quad (1.22)$$

Using (1.18), the output signal of the phase shifter shown in FIG. 3b is given by $$\underline{s}_\psi^{(k_T,n)}(t) = \sum_{k_d=1} \underline{s}^{(n)}(t) \cdot \exp\{j\psi(k_T, k_d, n)\}, \quad (1.23)$$

$$k_T \in \{1, \ldots, K_T\}, n \in \{1, \ldots, N\}.$$

In the next step, all N signals $\underline{s}_\psi^{(k_T,n)}(t)$ of (1.23) are linearly superimposed to form $$\underline{s}_\psi^{(k_T)}(t) = \sum_{n=1}^{N} \underline{s}_\psi^{(k_T,n)}(t), \quad (1.24)$$

$$k_T \in \{1, \ldots, K_T\}.$$

All further processing steps of the signal $\underline{s}_\psi^{(k_T)}(t)$ defined by (1.24) are the same as those described above, except for the fact that these have to be carried out separately for every transmitting light source $k_T$, $k_T \in \{1, \ldots K_T\}$.

In embodiments, receive beam-forming is done in the same way as it is accomplished in the case of radio transmission. The basic concept shall be considered in case of the reception of a narrowband signal in the following. It is assumed that the receive signal is received via $K_d$ directions at $K_R$ receiving sensors. Each direction is characterized by the baseband version of the CIR $\underline{h}^{(k_d)}(\tau,t), k_d \in \{1, \ldots, K_d\}$, $\tau$ being the delay parameter.

In order to generate the $k_d$-th directional receive signal $\underline{e}^{(k_d)}(t), k_d \in \{1, \ldots, K_d\}$, the output signal $\underline{e}^{(k_R)}(t), k_R \in \{1, \ldots, K_R\}$, at each receiving sensor can be weighted by $\exp(j\psi(k_R, k_d)), k_R \in \{1, \ldots, K_R\}, k_d \in \{1, \ldots, K_d\}$ using $$\psi(k_R, k_d) = 2\pi \cdot \frac{l^{(k_R)}}{\lambda} \cdot \cos\{\beta^{(k_d)} - \alpha^{(k_R)}\}, \quad (1.25)$$

$$k_T \in \{1, \ldots, K_T\}, k_d \in \{1, \ldots, K_d\}.$$

The directionally separated received signal $\underline{e}^{(k_d)}(t)$, $k_d \in \{1, \ldots K_d\}$, is hence given by $$\underline{e}^{(k_d)}(t) = \sum_{k_R=1}^{K_R} \underline{e}^{(k_R)}(t) \cdot \exp\{j\psi(k_R, k_d)\}, \quad (1.26)$$

$$k_d \in \{1, \ldots, K_d\}.$$

When assuming a transmitter 100 with a single transmitting light source 140 generating the transmit signal $\underline{s}(t)$ in the base band, and assuming the noise signal $\underline{n}^{(k_d)}(t)$, (1.26) can be given as $$\underline{e}^{(k_d)}(t) = \underline{h}^{(k_d)}(\tau,t) * \underline{s}(\tau) + \underline{n}^{(k_d)}(t) \int_{-\infty}^{\infty} \underline{s}(t-\tau) \underline{h}^{(k_d)}((\tau,t)d\tau + \underline{n}^{(k_d)}(t) \quad (1.27)$$

after bandpass processing, cf. above. This signal can be processed as explained in e.g. Blanz et al.

It is to be noted that the above description was given for embodiments utilizing beam-forming. It is noteworthy that the inclusion of spatial multiplexing in combination with space-time coding or space-frequency coding may also be applied in an optical system in other embodiments. Generally, once such processing is enabled by the above-described embodiments of a transmitter 100 and a receiver 200, other kinds of pre-coding or spatial multiplexing concepts may be utilized for optical communications as well.

Embodiments of the present invention may provide the advantage that directly modulated light sources may be deployed, for example using a DC-offset unit carrying out scaling, pre-distortion, DC-offset adding, etc., before the modulation of the light sources is carried out. Therewith, incoherent light sources may be used. Moreover, embodiments of the receiver may deploy a bandpass filtering unit, including a DC-offset compensator after the photo detector to remove any DC-offsets. This provides the advantage that no Mach-Zehnder-modulator is needed at the receiver, simple detection is enabled.

Furthermore, embodiments provide the advantage that arrays of light sources may be deployed at the transmitter, for example an array of LEDs to generate the optical transmit signal, which may be precoded, for example according to a beam-forming concept. This provides an enhanced system capacity and an increased data rate. It may also enables short-range, as for example indoor, optical communication, users may be provided with data services through optical communication.

Similar advantages are provided by embodiments of the respective receiver, where an array of photo detectors may be utilized in order to carry out respective coding or beamforming concepts.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A transmitter for transmitting an optical signal based on a baseband signal, comprising:
   a digital-to-analog converter for converting a digital baseband signal comprising information to be transmitted into an analog baseband signal comprising the information to be transmitted;
   a transmit-phase-shifter for transmit-phase-shifting the analog baseband signal to acquire a phase-shifted baseband signal;
   an up-transformer for up-transforming the phase-shifted baseband signal and another baseband signal to acquire bandpass signals;
   a converter for converting the bandpass signals into signals comprising a DC-offset; and
   a modulator for modulating a plurality of light sources with the signals comprising the DC-offset to transmit the optical signals;
   wherein, the transmit-phase-shifter is adapted for phase-shifting the analog baseband signal according to a precoding scheme, a spatial multiplexing scheme and/or a beamforming scheme.

2. The transmitter of claim 1 wherein the modulator is adapted for modulating the plurality of light sources for free space transmission.

3. The transmitter of claim 1 wherein the converter is configured for adapting the DC-offset to a characteristic of the plurality of light sources, to a power control procedure, to a non-linear characteristic of the plurality of light sources and/or to a pre-distortion concept.

4. The transmitter of claim 1, wherein the plurality of light sources comprises incoherent light sources, light emitting diodes or laser diodes.

5. The transmitter of claim 1, further comprising another light source, wherein the up-transformer is adapted for up-transforming another baseband signal to acquire another bandpass signal and wherein the converter is adapted for converting the other bandpass signal into another signal comprising a DC-offset and wherein the modulator is configured for modulating the other light source with the other signal comprising the DC-offset to transmit another optical signal.

6. The transmitter of claim 5 comprising a plurality of light sources and being adapted for transmitting a plurality of optical signals.

7. The transmitter of claim 1, wherein the transmit-phase-shifter is adapted for phase-shifting according to a space-time-coding scheme or a space-frequency-coding scheme.

8. The transmitter according to claim 1, wherein the transmit-phase-shifter is configured for adapting the phase-shifting to the wavelength of a subcarrier, to multiple directions of propagation paths of the optical signal and/or according to a Zero-Forcing Block Linear Equalization.

9. A lighting comprising a transmitter according to claim 1.

10. A method for transmitting an optical signal based on a baseband signal, comprising:

converting a digital baseband signal comprising information to be transmitted into an analog baseband signal comprising the information to be transmitted;

transmit-phase-shifting the analog baseband signal to acquire a phase-shifted baseband signal;

up-transforming the phase-shifted baseband signal and another baseband signal to acquire bandpass signals;

converting the bandpass signals into signals comprising a DC-offset; and modulating a plurality of light sources with the signals comprising the DC-offset to transmit the optical signals;

wherein the transmit-phase-shifting is adapted for phase-shifting the analog baseband signal according to a pre-coding scheme, a spatial multiplexing scheme and/or a beamforming scheme.

11. A receiver for receiving baseband signals based on a plurality of optical signals, comprising:

a demodulator for demodulating the optical signals into electrical bandpass signals comprising a DC-offset;

a compensator for compensating the DC-offset to acquire DC-offset compensated bandpass signals; and a down-transformer for down-transforming the DC-offset compensated bandpass signals to acquire the baseband signals; and a receive-phase-shifter for receive-phase-shifting the baseband signals according to a coding scheme, a spatial multiplexing scheme and/or a beam-forming scheme, wherein, the baseband signals based on a plurality of optical signals were created by a method which includes the steps of:

converting a digital baseband signal comprising information to be transmitted into an analog baseband signal comprising the information to be transmitted; and transmit-phase-shifting the analog baseband signal to acquire a phase-shifted baseband signal.

12. The receiver of claim 11 further comprising a receiver for receiving the optical signal.

13. The receiver of claim 12, wherein the receiver comprises a plurality of photo detectors.

14. The receiver of claim 11, wherein the receive-phase-shifter is configured for adapting the phase-shifting to a space-time coding scheme or a space-frequency coding scheme.

15. The receiver of claim 11, wherein the phase-shifting is adapted to a wavelength of a subcarrier and/or to multiple directions of reception of the optical signal.

16. A mobile device comprising a receiver for receiving baseband signals based on a plurality of optical signals, the receiver comprising:

a demodulator for demodulating the optical signals into electrical bandpass signals comprising a DC-offset;

a compensator for compensating the DC-offset to acquire DC-offset compensated bandpass signals; and a down-transformer for down-transforming the DC-offset compensated bandpass signals to acquire the baseband signals; and a receive-phase-shifter for receive-phase-shifting the baseband signals according to a coding scheme, a spatial multiplexing scheme and/or a beam-forming scheme, wherein, the baseband signals based on a plurality of optical signals were created by a method which includes the steps of:

converting a digital baseband signal comprising information to be transmitted into an analog baseband signal comprising the information to be transmitted; and transmit-phase-shifting the analog baseband signal to acquire a phase-shifted baseband signal.

17. A method for receiving baseband signals based on a plurality of optical signals comprising:

demodulating the optical signals into electrical bandpass signals comprising a DC-offset;

compensating the DC-offset to acquire DC-offset compensated bandpass signals; and down-transforming the DC-offset compensated bandpass signals to acquire the baseband signals; and receive-phase-shifting the baseband signals according to a coding scheme, a spatial multiplexing scheme and/or a beam forming scheme, wherein, the baseband signals based on a plurality of optical signals were created by a method which includes the steps of:

converting a digital baseband signal comprising information to be transmitted into an analog baseband signal comprising the information to be transmitted; and transmit-phase-shifting the analog baseband signal to acquire a phase-shifted baseband signal.

18. A system comprising a transmitter for transmitting an optical signal based on a baseband signal, the transmitter comprising:

a digital-to-analog converter for converting a digital baseband signal comprising information to be transmitted into an analog baseband signal comprising the information to be transmitted;

a transmit-phase-shifter for transmit-phase-shifting the analog baseband signal to acquire a phase-shifted baseband signal;

an up-transformer for up-transforming the phase-shifted baseband signal and another baseband signal to acquire bandpass signals;

a converter for converting the bandpass signals into signals comprising a DC-offset; and a modulator for modulating a plurality of light sources with the signals comprising the DC-offset to transmit the optical signals;

wherein the transmit-phase-shifter is adapted for phase-shifting the analog baseband signal according to a pre-coding scheme, a spatial multiplexing scheme and/or a beamforming scheme;

and a receiver for receiving baseband signals based on a plurality of optical signals, the receiver comprising:

a demodulator for demodulating the optical signals into electrical bandpass signals comprising a DC-offset;

a compensator for compensating the DC-offset to acquire DC-offset compensated bandpass signals; and a down-transformer for down-transforming the DC-offset compensated bandpass signals to acquire the baseband signals; and a receive-phase-shifter for receive-phase-shifting the baseband signals according to a coding scheme, a spatial multiplexing scheme and/or a beam-forming scheme.

19. A computer program comprising a program code for performing the method for transmitting an optical signal based on a baseband signal, the method comprising:

converting a digital baseband signal comprising information to be transmitted into an analog baseband signal comprising the information to be transmitted;

transmit-phase-shifting the analog baseband signal to acquire a phase-shifted baseband signal;

up-transforming the phase-shifted baseband signal and another baseband signal to acquire bandpass signals;

converting the bandpass signals into signals comprising a DC-offset; and modulating a plurality of light sources with the signals comprising the DC-offset to transmit the optical signals;

wherein the transmit-phase-shifting is adapted for phase-shifting the analog baseband signal according to a precoding scheme, a spatial multiplexing scheme and/or a beamforming scheme, when the computer program runs on a computer or processor, wherein, the computer program is stored in a non-transitory digital storage medium selected from a floppy disk, a DVD, a Blue-Ray, a CD, a ROM, a PROM, an EPROM, an EEPROM and a FLASH memory.

20. A computer program comprising a program code for performing the method for receiving baseband signals based on a plurality of optical signals, the method comprising:

demodulating the optical signals into electrical bandpass signals comprising a DC-offset;

compensating the DC-offset to acquire DC-offset compensated bandpass signals; and down-transforming the DC-offset compensated bandpass signals to acquire the baseband signals; and receive-phase-shifting the baseband signals according to a coding scheme, a spatial multiplexing scheme and/or a beam forming scheme, when the computer program runs on a computer or processor, wherein, the computer program is stored in a non-transitory digital storage medium selected from a floppy disk, a DVD, a Blue-Ray, a CD, a ROM, a PROM, an EPROM, an EEPROM and a FLASH memory, and wherein, the baseband signals based on a plurality of optical signals were created by a method which includes the steps of:

converting a digital baseband signal comprising information to be transmitted into an analog baseband signal comprising the information to be transmitted; and transmit-phase-shifting the analog baseband signal to acquire a phase-shifted baseband signal.

* * * * *